(12) United States Patent
Detlefs et al.

(10) Patent No.: US 7,340,494 B1
(45) Date of Patent: Mar. 4, 2008

(54) GARBAGE-FIRST GARBAGE COLLECTION

(75) Inventors: David L. Detlefs, Westford, MA (US);
Steven K. Heller, Acton, MA (US);
Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 511 days.

(21) Appl. No.: 10/985,447

(22) Filed: Nov. 11, 2004

Related U.S. Application Data

(63) Continuation-in-part of application No. 10/799,049, filed on Mar. 12, 2004, now abandoned.

(51) Int. Cl.
*G06F 17/30* (2006.01)

(52) U.S. Cl. .............. 707/206; 707/100; 711/159; 711/170

(58) Field of Classification Search .................. None
See application file for complete search history.

(56) References Cited

U.S. PATENT DOCUMENTS

| | | | |
|---|---|---|---|
| 5,819,292 A | | 10/1998 | Hitz et al. |
| 5,933,840 A | * | 8/1999 | Menon et al. ............. 707/206 |
| 6,185,581 B1 | * | 2/2001 | Garthwaite ................ 707/206 |
| 6,308,185 B1 | | 10/2001 | Grarup et al. |
| 6,317,756 B1 | | 11/2001 | Kolodner et al. |
| 6,393,439 B1 | * | 5/2002 | Houldsworth et al. ...... 707/206 |
| 6,434,576 B1 | | 8/2002 | Garthwaite |
| 6,470,361 B1 | * | 10/2002 | Alpern et al. ............. 707/206 |
| 2003/0182597 A1 | * | 9/2003 | Coha et al. ............... 714/38 |

OTHER PUBLICATIONS

A Highly Effective Partition Selection Policy for Database Garbage Collection by Jonthan E. Cook et al. published Jan./Feb. 1998 by IEEE Transactions on knowledge and data engineering, pp. 153-171.*
Ben-Yitzhak, Ori, et al. "An Algorithm for Parallel Incremental Compaction," In roceedings of 2002 International Symposium on Memory Management, ACM, 2002, pp. 100-105.

(Continued)

*Primary Examiner*—Kevin L. Ellis
*Assistant Examiner*—Kaushik Patel
(74) *Attorney, Agent, or Firm*—Osha· Liang LLP

(57) ABSTRACT

A garbage collector treats a garbage-collected heap as divided into heap regions, for each of which it maintains a respective remembered set, whose entries list the locations where references located in the heap outside that region refer to references inside that region. The remembered sets are used during space-incremental collection operations on collection sets of those regions; if the garbage collector determines that objects in the collection set are not referred to directly or indirectly from outside the collection set, it reclaims the memory space that they occupy. It places entries into the remembered sets independently of the locations at which the references were found, so any region can be chosen for inclusion in any collection set; no predetermined collection order is required. Instead, the garbage collector performs global marking operations and uses the results to select for collection-set membership the regions that it can most likely collect efficiently.

22 Claims, 22 Drawing Sheets

OTHER PUBLICATIONS

Lang, Bernard and DuPont, Francis. "Incremental Incrementally Compacting Garbage Collection," In Programing of Future Generation Computers II, Elsevier, 1988, pp. 163-182.

Jones, Richard and Lins, Rafael. "Garbage Collection Algorithms for Automatic Dynamic Memory Management," John Wiley & Sons, Ltd., Copyright 1966, West Sussex, England, Chapter 7, pp. 143-181.

Bacon, David E., et al. "The Metronome" A Simpler Approach to Garbage Collection in Real-Time Systems, R. Meersman and Z. Tari (Eds.): OTM Workshops 2003, LNCS 2889, pp. 466-478, 2003.

* cited by examiner ously assigned copending U.S. patent application Ser. No.
GARBAGE-FIRST GARBAGE COLLECTION

CROSS-REFERENCE TO RELATED APPLICATIONS

The present application is a continuation-in-part of commonly assigned copending U.S. patent application Ser. No. 10/799,049, which was filed on Mar. 12, 2004 now abandoned, by Detlefs et al. for Garbage-First Garbage Collection and is hereby incorporated by reference. This application is related to U.S. patent applications Ser. Nos. 10/799,187 of David L. Detlefs for a Concurrent-Marking-Initiation Heuristic, Ser. No. 10/799,427 of David L. Detlefs and Steven K. Heller for Age Segregation for Garbage Collector, 10/800,363 of David L. Detlefs, Steven K. Heller, and Ross C. Knippel for Mixing Copying Collection and Concurrent Marking, Ser. No. 10/799,186 of David L. Detlefs for Exploiting Popular Objects to Reduce Mutator Overhead.

BACKGROUND OF THE INVENTION

1. Field of the Invention

The present invention concerns computer-program compiling and in particular to what has in that discipline come to be referred to as "garbage collection."

2. Background Information

Garbage collection is the term that has come to be used for the operations by which data objects that a program will no longer use are recognized so that the computer memory occupied by those objects can be reclaimed for reuse. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. An object also may belong to a class, which is an organizational entity that may contain method code or other information shared by all objects belonging to that class. In the discussion that follows, though, the term object will not be limited to such structures; it will additionally include structures with which methods and classes are not associated.

Garbage collection is used almost exclusively in environments in which memory can be allocated to some objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data that a microprocessor 11 uses and instructions for operating on them may reside in onboard cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14. Those caches would swap data and instructions with the RAM 14 just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Some computer systems may employ a plurality of processors so that different processes' executions actually do occur simultaneously. Such systems come in a wide variety of configurations. Some may be largely the same as that of FIG. 1 with the exception that they include more than one microprocessor such as processor 11, possibly together with respective cache memories, sharing common read/write memory by communication over the common bus 16.

In other configurations, parts of the shared memory may be more local to one or more processors than to others. In FIG. 2, for instance, one or more microprocessors 20 at a location 22 may have access both to a local memory module 24 and to a further, remote memory module 26, which is provided at a remote location 28. Because of the greater distance, though, port circuitry 29 and 30 may be necessary to communicate at the lower speed to which an intervening channel 32 is limited. A processor 34 at the remote location may similarly have different-speed access to both memory modules 24 and 26. In such a situation, one or the other or both of the processors may need to fetch code or data or both from a remote location, but it will often be true that parts of the code will be replicated in both places.

Despite these expedients, the use of static memory allocation in writing certain long-lived applications makes it difficult to restrict storage requirements to the available memory space. Abiding by space limitations is easier when the platform provides for dynamic memory allocation, i.e., when the platform enables allocation of memory space to be delayed until after the program has been loaded and is already running.

Dynamic allocation has a number of advantages, among which is that the run-time system is able to adapt allocation to run-time conditions; for given objects the programmer can specify respective conditions on which space should be allocated to them. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak." Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicitly managing dynamic memory by using interfaces like malloc( )/ free( ) often leads to these problems.

Such leaks and related errors can be made less likely by reclaiming memory space more automatically. As was mentioned above, the software and/or hardware used for this purpose is typically referred to as a garbage collector. Garbage collectors operate by inspecting the running program's current state, determining from that state whether it can decide that there are some objects that the program can no longer reach, and reclaiming objects thus found not to be reachable. The criteria that garbage collectors use for this purpose vary, but, for example, a program's global variables are normally considered reachable throughout a program's life. Although they are not ordinarily stored in the memory space that the garbage collector manages, they may contain references to dynamically allocated objects that are, and the garbage collector will consider such objects reachable. It will typically also consider an object reachable if it is referred to by a reference in a register or a thread's call stack. And reachability is contagious: if a reachable object refers to another object, that other object is reachable, too.

It is advantageous to use garbage collectors because, whereas a programmer working on a particular sequence of code can perform his task creditably in most respects with only local knowledge of the application, memory allocation and reclamation tend to require more-global knowledge. A programmer dealing with a small subroutine, for example, may well be able to identify the point in the subroutine beyond which the routine has finished with a given memory portion, but knowing whether the application as a whole will be finished with it at that point is often much more difficult. In contrast, garbage collectors typically work by tracing references from some conservative notion of a "root set," e.g., global variables, registers, and the call stack: they thereby obtain reachability information methodically. By using a garbage collector, the programmer is relieved of the need to worry about the application's global state and can concentrate on (more-manageable) local-state issues. The result is applications that are more robust, having no dangling references and fewer memory leaks.

Garbage-collection mechanisms can be implemented by various parts and levels of a computing system. One approach is simply to provide them as part of a batch compiler's output. Consider FIG. 3's simple batch-compiler operation, for example. A computer system executes in accordance with compiler object code and therefore acts as a compiler 36. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that typically carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 38, which typically operates on input such as mouse clicks, etc., to generate a display or some other type of output. This object code implements the relationship that the programmer intends to specify by his application source code. In one approach to garbage collection, the compiler 36, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of hardware that lends itself particularly to use in garbage collection. So even a very simple system may disperse the garbage-collection mechanism over a number of computer-system layers.

To get some sense of the variety of system components that can be used to implement garbage collection, consider FIG. 4's example of a more complex way in which various levels of source code can result in the machine instructions that a processor executes. In the FIG. 4 arrangement, the human applications programmer produces source code 40 written in a high-level language. A compiler 42 typically converts that code into "class files." These files include routines written in instructions, called "byte code" 44, for a "virtual machine" that various processors can be software-configured to emulate. This conversion into byte code is almost always separated in time from that code's execution, so FIG. 4 divides the sequence into a "compile-time environment" 46 separate from a "run-time environment" 48, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 50. That process emulates a virtual machine from whose instruction set the byte code is drawn. As is true of the compiler 42, the virtual-machine process 50 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted by electromagnetic signals to the virtual-machine-implementing processor.

In some implementations, much of the virtual machine's action in executing these byte codes is most like what those skilled in the art refer to as "interpreting," so FIG. 4 depicts the virtual machine as including an "interpreter" 52 for that purpose. In addition to or instead of running an interpreter, many virtual-machine implementations actually compile the byte codes concurrently with the resultant object code's execution, so FIG. 4 depicts the virtual machine as additionally including a "just-in-time" compiler 54.

The resultant instructions typically invoke calls to a run-time system 56, which handles matters such as loading new class files as they are needed and includes much of garbage-collector implementation. The run-time system will typically call on the services of an underlying operating system 58. Among the differences between the arrangements of FIGS. 3 and 4 in that FIG. 4's compiler 40 for converting the human programmer's code does not contribute to providing the garbage-collection function; that results largely from the virtual machine 50's operation.

Independently of the specific system-architecture levels at which the collector resides, garbage collection usually includes some amount of reference tracing to determine whether objects are at least potentially reachable; if they are not potentially reachable, they are garbage, and their memory space can therefore be reclaimed. The most straight-forward and accurate way to do the tracing is to start at the root set and scan recursively for referred-to objects until all have been identified. If an object is not encountered in that process, it is not reachable, even if it is referred to by a reference in some other object.

Now, it would be unacceptable in many applications to have the mutator pause while the collector traces references through the whole heap. So some garbage collectors perform the tracing in threads of execution that (mostly) operate concurrently with the mutator. They mark the objects thereby encountered, and, possibly with some exceptions, objects that remain unmarked at the end of the marking operation can be recognized as garbage. The memory blocks occupied by thus-recognized objects can be reclaimed concurrently with mutator execution. Since most of such a marking-and-sweeping operation executes concurrently with mutator execution, this approach limits pause times. For large heaps, though, the marking is expensive, and it can slow mutator execution.

Another solution is for the garbage collector to operate "space-incrementally." In each successive collection increment, which typically (but not necessarily) is all performed during a single pause in mutator execution, the collector considers a small portion, or collection set, of the heap. For respective regions of the heap, the collector keeps track of the references in other regions that refer directly to objects in those regions. A collection-set object can be recognized as unreachable if no reference chain from such a reference includes it. This approach can often limit pause time adequately without the complexity of requiring the collector to operate concurrently with the mutator, although some space-incremental approaches nonetheless do employ some concurrent operations.

With nothing more, the space-incremental approach would tend to leave garbage "cycles," in which references from other garbage objects prevent garbage objects' memory from being reclaimed. But an approach referred to as the "train algorithm," in which the heap regions are referred to as "cars," imposes a collection ordering among the cars that tends to ensure that garbage cycles eventually get reclaimed. Also, that approach evacuates potentially reachable objects from regions being reclaimed and thereby tends to compact the heap. But it tends to leave more garbage unrecognized than a whole-heap marking would.

SUMMARY OF THE INVENTION

We have found a way to combine the better features of the concurrent-marking and space-incremental-collection approaches. Although it performs space-incremental collection, it does not impose a collection order based on the need to avoid garbage cycles. Instead, it performs a heap-wide marking operation, bases collection-set selection on that operation's results, and also uses those results during collection as one of the ways in which it identifies garbage objects. Although the marking operation does exact a cost when large heaps are involved, it turns out that using space-incremental collection in combination with that marking reduces the frequency with which the marking needs to be performed.

BRIEF DESCRIPTION OF THE DRAWINGS

The invention description below refers to the accompanying drawings, of which:

FIG. 6 is a time-line diagram depicting the interposition of collection pauses within marking operations

FIG. 22 is a flow chart showing how the illustrated embodiment identifies regions to which non-popular objects should be evacuated;

DETAILED DESCRIPTION OF AN ILLUSTRATIVE EMBODIMENT

Figure 1:
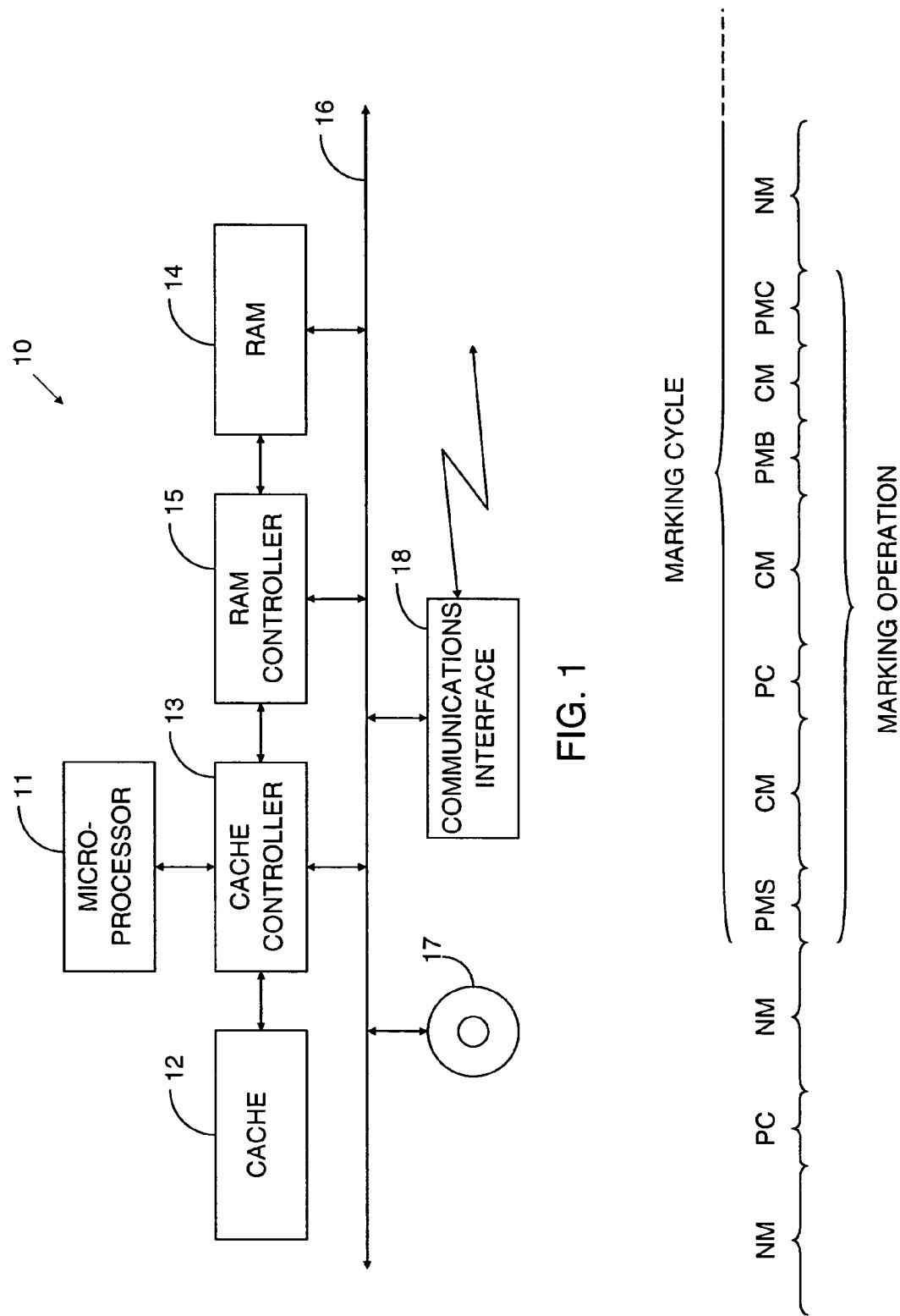
FIG. 1 is a block diagram that illustrates a typical computer system in which the present invention's teachings may be practiced.
Figure 2:
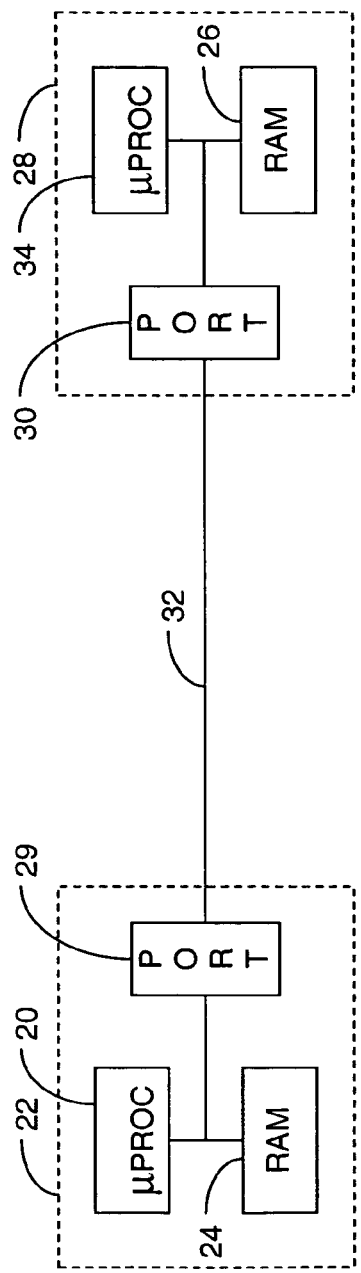
FIG. 2 is a block diagram of a multiprocessor computer system, which can also use the present invention's teachings.
Figure 3:
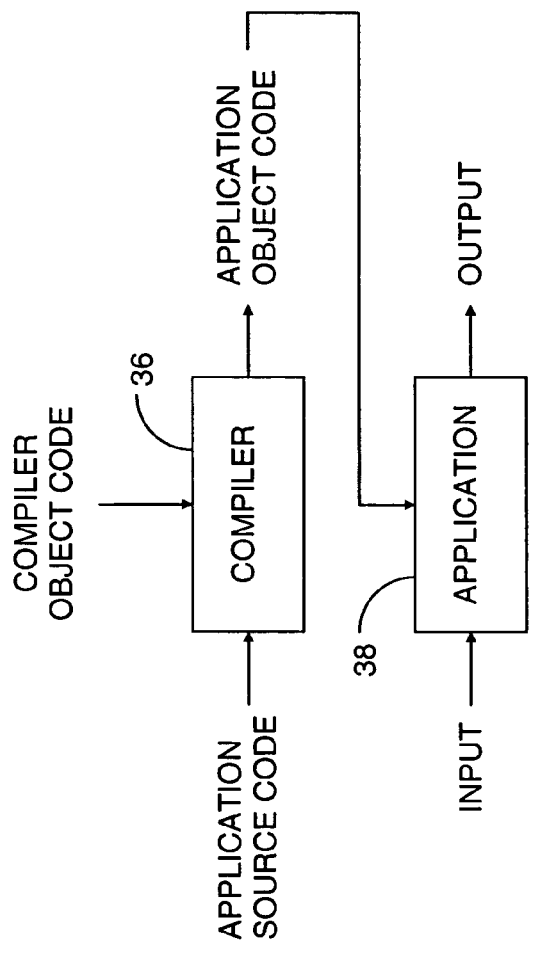
FIG. 3 is a block diagram that illustrates the relationship between a compiler and the resultant application program.
Figure 4:
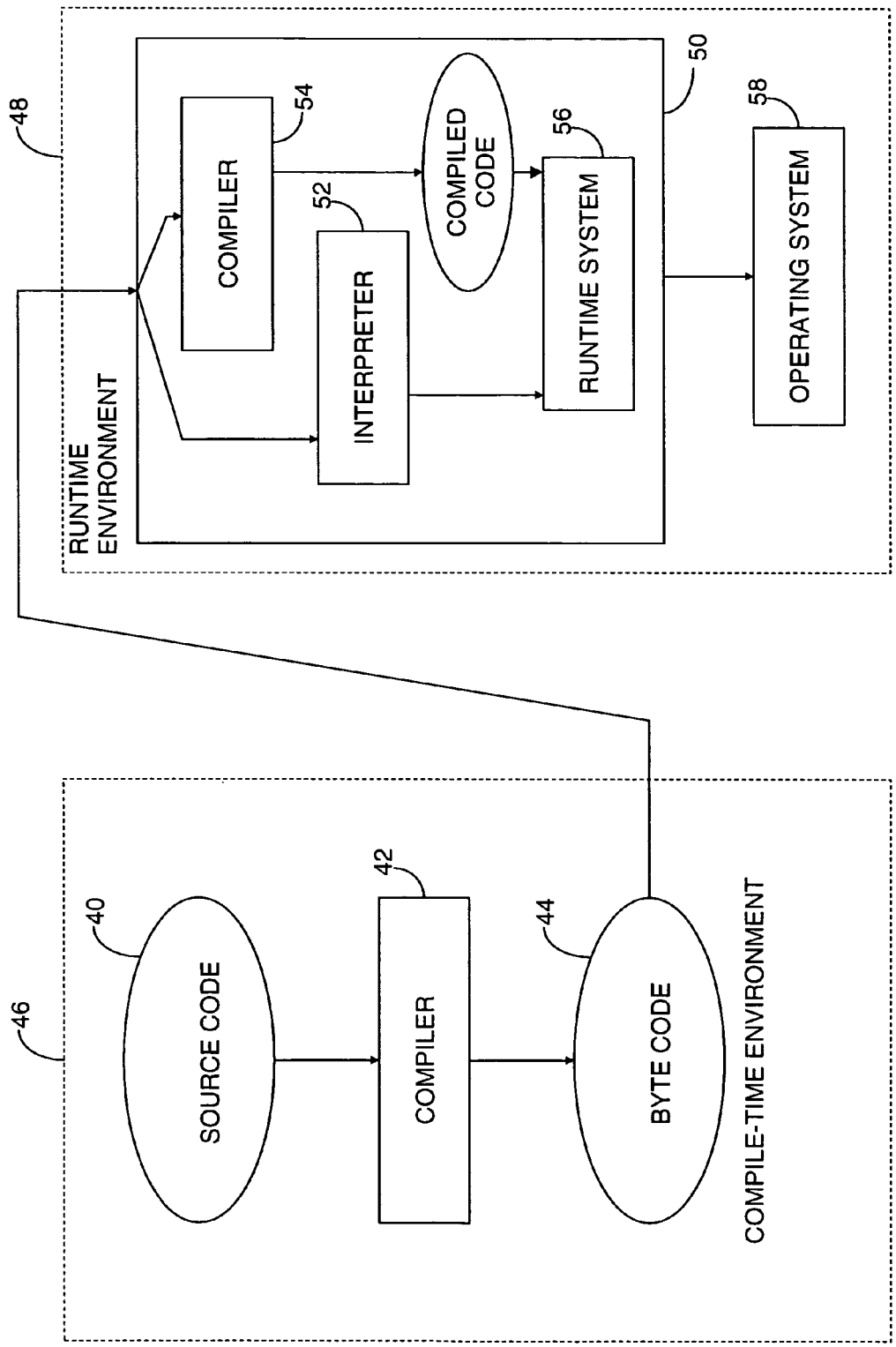
FIG. 4 is a block diagram that illustrates another way in which source code can result in an executing program.

The present invention can be implemented in a wide range of garbage collectors. Many such garbage collectors will treat the heaps that they manage as being divided into generations. Initial allocation for new objects will typically occur in a "young" generation, where mortality is expected to be high, i.e., where in many programs most objects soon become unreachable. The young-generation objects whose longevity nonetheless proves to be high are typically promoted into an "older" generation; they are moved to a part of the heap occupied by such longer-lived objects. When such a garbage collector implements the teachings to be set forth below, it may implement them in less than all generations, or it may implement them in every generation.

Although, as was just stated, the invention can be implemented in multiple-generation collectors, we prefer to implement it in a single-generation collector. The discussion below therefore describes the invention's features by reference to such a collector. For the sake of concreteness, we will assume that the collector is provided, as was mentioned above, as part of a virtual machine.

In discussions of garbage collection, the portion of a program that performs the operations specific to the program's main purpose (e.g., word processing, telephone-call routing, etc.) is referred to as the mutator; from the collector's point of view, the mutator's function is to modify the reference graph on which the collector operates. The collector will typically have to interrupt the mutator from time to time to perform certain of its tasks.

Consider a "copying" collector, for instance, of which the collector about to be described is an example. The copying approach is used in order to keep heap fragmentation low. To enable it to reclaim relatively large blocks of contiguous space, a copying collector often evacuates potentially reachable objects from among unreachable objects, i.e., copies them to other locations so that the memory that they originally occupied can be reclaimed with the memory occupied by the unreachable objects. Although many of the collector's tasks can be performed by, say, a collector thread that executes concurrently with the mutator, evacuation does not lend itself readily to concurrent performance; references to the evacuated objects need to be updated, and a mutator that attempts to access an object between the time when that object is evacuated and the time when references to that object are updated to reflect its new location is likely to exhibit unpredictable behavior. So most copying collectors interrupt the mutator at least for evacuation.

Unfortunately, a mutator pause long enough for a complete collection is often unacceptable; telephone-company subscribers would find a several-second pause in a call-switching program annoying, for instance. So collectors, including the one about to be described, often operate space-incrementally: they operate in increments in each of which they consider only a relatively small heap portion, called a collection set, and identify unreachable objects in the collection set without necessarily tracing the entire reference graph from the root set. For example, we describe below one way in which the collector can, without tracing references throughout the entire heap, determine for each collection-set object whether it is referred to from outside the collection set, and a group of objects within the collection set can be considered unreachable if none of the group's members is referred to directly by any root or any reference in an object not in the group. (As will also be seen below, the illustrated collector will additionally employ other criteria for concluding that objects are unreachable.)

To implement space-incremental collection, the collector treats the heap that it manages as being divided into heap regions, among which it selects to form the collection set for each collection increment. For the sake of concreteness we will consider the example of a collector that employs a single standard region size, since the resultant simplicity of region identification will make this a typical approach. The collector maintains metadata for each region, for purposes that will become apparent below. If an object larger than the standard region size needs to be allocated, the illustrated embodiment temporarily increases to some integral number of normal-region sizes the size of the region in which the object to be allocated begins. Also, for reasons to be discussed in due course, the illustrated embodiment places any object larger than three-quarters of the standard region size in its own region: no other object is placed in a region thus occupied.

At various points during mutator operation a decision will be made that a collection increment needs to be performed. Although the particular decision criterion is not germane to the present discussion, the decision is usually based to some extent on how much space the mutator has allocated since the last collection increment, or on how much heap space is left. In any event, the collector at that time selects the regions that will constitute the collection set. In some types of space-incremental collectors the regions selected are the "oldest," i.e., the ones in which the objects were first allocated the longest time before. This approach has a certain appeal, since doing so gives the region contents the longest time to "die" before a collection. This can make the collection relatively efficient: the amount of space reclaimed in a given collection should be large. Even though a given region has the most garbage, though, choosing it for collection may not be the best choice.

Figure 5:
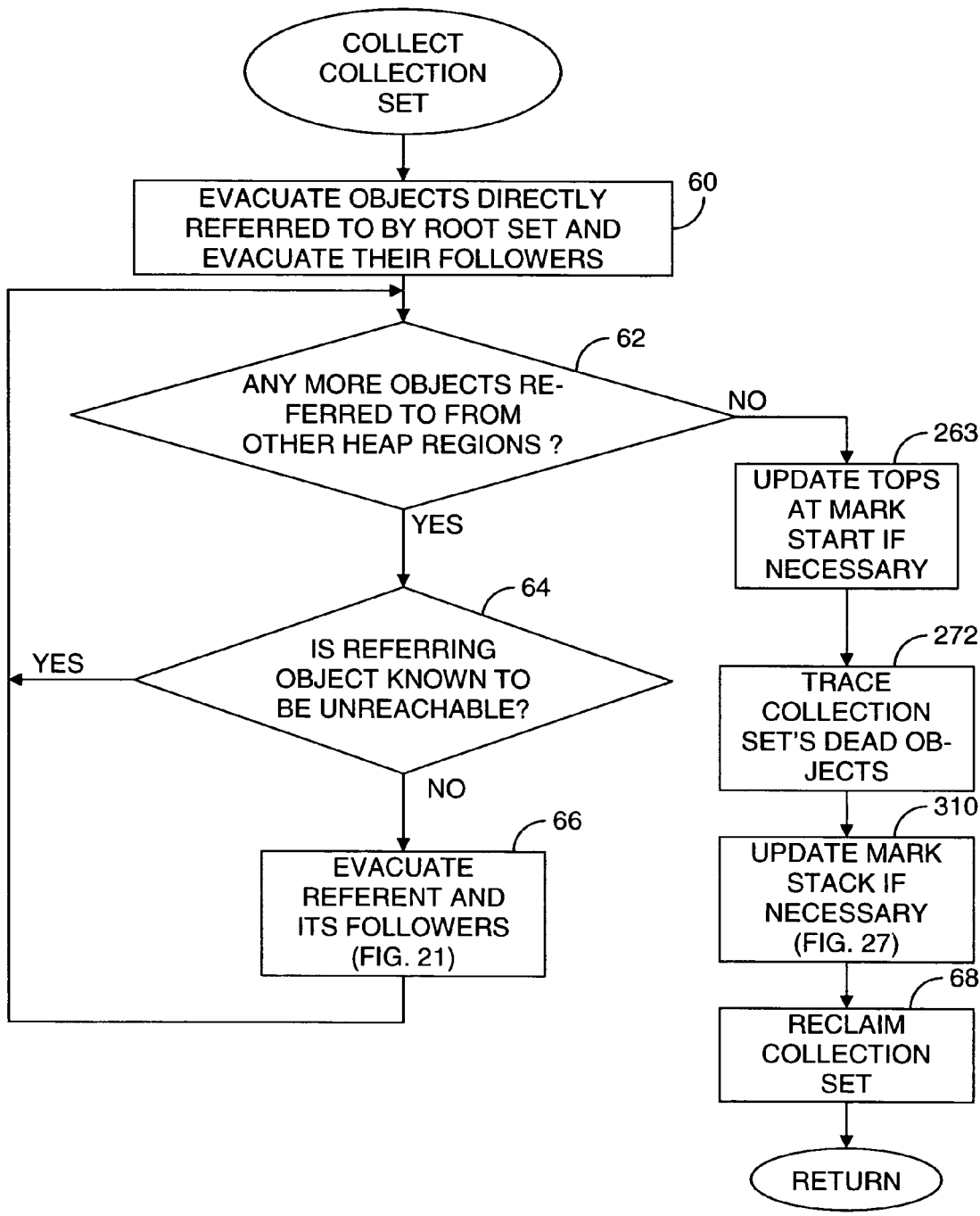
FIG. 5 is a simplified flow chart of a collection increment.

To understand this, consider FIG. 5, which is a simplified flow chart of a region's collection. As was mentioned above, an object is reachable if there is a reference to it in the root set, which typically includes non-heap locations such as registers, call stacks, static variables, etc. So block 60 represents identifying references in the root set that refer to objects in the collection set, evacuating to non-collection-set regions the objects thus referred to, and recursively evacuating to such regions any followers, i.e., any collection-set references referred to from objects thus evacuated.

Note that the block-60 operation does not necessarily evacuate all reachable collection-set objects. In order to contain cost, that operation traces reference chains from only those root-set references that refer directly to collection-set objects; it does not exhaustively trace reference chains that may have led from root-set references though other regions to those in the collection set. To ensure that collection-set objects reachable through such chains are not left in the collection set and their space thereby reclaimed, the collector performs the operation that block 62 represents: it determines whether there are any collection-set objects referred to from objects in non-collection-set heap regions.

For that purpose, the metadata for each region include a "remembered set." As will be explained in more detail below, a remembered set is a list of all locations that at some time contained references into that region. If they previously contained such references, they may still, so the collector scans the thus-identified locations for references into the collection set. Now, the object containing a reference thus found may itself be garbage, so the collection-set object that it refers to may be, too. But, unless in an operation represented by block 64 the collector finds that it has further information, of a type to be described below, on which it can base a conclusion that the object definitely is garbage, the collector will evacuate a thus-referred-to object and its followers, as block 66 indicates, making the conservative assumption that the referred-to object is not garbage. Any objects not thus evacuated definitely are garbage, though, so all of the collection set's memory space can be reclaimed for re-allocation, as block 68 indicates.

One aspect of FIG. 5 that is relevant to collection-set selection is the search for cross-region references that block 62 represents. As was just explained, the collector uses the collection-set member regions' remembered sets for this purpose. Since a remembered set, as was also just explained, is a list of locations where references into the region have been observed, remembered-set sizes—and the attendant cost of scanning them—can vary greatly among regions. So, even if a region is old and is therefore likely contain a lot of garbage, the best choice may be not to include it in the collection set if its remembered set is large. Consequently, the illustrated embodiment does not simply choose the oldest regions for collection-set membership. Instead, it makes a selection that is based in part on remembered-set size.

But remembered-set size is not the only factor that the illustrated embodiment takes into account in arriving at collection-set membership. Another factor is the amount of garbage likely to be collected. And, although it is often true that the oldest regions tend to contain the most garbage, there are counterexamples. So, for at least some of the regions, the illustrated collector employs what we refer to as a "garbage-first" approach in determining whether to include them in the collection set. In accordance with this approach, the collector employs a garbage-content estimate that is not based simply on region age. In the illustrated embodiment, this involves employing a full-heap marking, most of which is preferably performed concurrently with mutator execution, to arrive at a minimum-garbage-content value for each of the older regions.

One way of using this information is to compute an expected efficiency value for at least some of the regions that are candidates for inclusion in the collection set. For example, the cost of a collection pause may be estimated by, say, $$V(cs) = V_{fixed} + U \cdot d + \sum_{r \in cs}(S \cdot rsSize(r) + C \cdot liveBytes(r)),$$

where $V(cs)$ is the cost of collecting collection set cs, $V_{fixed}$ represents fixed costs common to all pauses, d is the number of remembered-set-log-buffer entries (explained below) needed to be scanned to update the remembered sets before using them, U is the average cost per entry, S is the cost per entry of scanning a remembered set, $rsSize(r)$ is the number of entries in the remembered set maintained for region r, C is the cost per byte of evacuating and scanning a live object, and $liveBytes(r)$ is an estimate of how many live bytes region r contains. The efficiency of a given collection set's collection may be computed as the ratio of the garbage estimate (e.g., the difference between the collection-set size and the estimated number of live bytes) to the cost, and the regions can be chosen to maximize this efficiency. As will be seen below, there are sometimes regions for which the marking mentioned above results in no minimum garbage-content value, so the illustrated embodiment uses an age-based estimate for those regions.

We now discuss how the illustrated embodiment performs the marking on which it bases its garbage estimates. In the marking operation the collector traces the reference chains from all roots, "marking" as reachable each object encountered in the process. As those skilled in the art are aware, there are many ways to mark an object. For example, an object's format may include a header field that indicates whether the object was found to be reachable in the last marking. In the illustrated embodiment, though, the collector employs a marking bitmap separate from the objects thereby marked. For every heap location at which an object can start in accordance with the system's alignment policy, the marking bitmap includes a corresponding bit that indicates whether a reachable object has been found to start at that location. If the system's alignment policies dictate that objects can start only at byte addresses ending in $000_2$, for example, the size of the marking bitmap will be $\frac{1}{64}$ that of the heap. (Actually, for reasons that will presently become apparent, the illustrated embodiment employs two such marking bitmaps.)

Some embodiments that employ marking may simply stop the mutator and, while the mutator is stopped, perform all the tracing and marking. But the resultant pause may be too long in some applications, so the illustrated embodiment instead performs much of the marking concurrently with mutator operation: as one or more mutator threads are executing, one or more marking threads may be tracing references and marking referred-to objects.

FIG. 6 is a time line that shows how marking may be interleaved with other collector operations, and it shows that a marking may span several collection increments. The first interval has an "NM" legend to indicate that no marking is in progress and that the mutator is not otherwise interrupted. This does not mean that the collector is idle, though. As will be seen, for example, the garbage collector may perform remembered-set maintenance concurrently with mutator operation. In a multiprocessor environment, this may mean that the mutator is executing on one or more of the processors simultaneously with the collector's remembered-set-maintenance operation on one or more other processors.

The next, "PC" interval represents a pause for collector copying. During this interval, the mutator is interrupted so that the evacuations and accompanying reference updates are atomic with respect to mutator activity. A non-marking ("NM") interval then occurs, during which the mutator again executes. At some point a decision is made to perform a marking, and, as will be explained further below, a pause for mark start-up ("PMS") occurs, during which the mutator does not execute. Most marking activity is concurrent, though, and the next interval represents concurrent marking ("CM"), during which the mutator can execute. Again, the concurrent operations may be taking place in different processors simultaneously in a multiprocessor environment.

As subsequent intervals indicate, that marking and the concurrent mutator execution may be interrupted from time to time for collector-copying pauses ("PC"). Eventually, the marking operation will require other threads to pause ("PMB") to complete its inspection of information left it, as will be explained below, by so-called write barriers that the mutator threads execute. Some more concurrent marking ("CM") then occurs, after which the marking ends with a pause for marking clean-up ("PMC"), during which mutator threads are again suspended.

The purpose for marking reachable objects is to identify garbage objects by process of elimination: if an object's location is not marked, it is garbage. So, in the operation mentioned above in connection with FIG. 5's block 64, the illustrated embodiment's collection operation relies on the marking operation's results to avoid evacuating garbage objects. Yet the process of elimination just mentioned presupposes that the marking has been completed, whereas, as the time line indicates, the mutator and collection operations can be executing while the marking operation is still in progress. Additionally, the mutator and copying operations modify the reference chains that the marking operations trace—while the marking threads are in the process of tracing them.

There are a number of ways in which an embodiment that employs concurrent marking can deal with these complications. The particular way in which the illustrated embodiment deals with the first complication, namely, that the marking operation is sometimes incomplete while the mutator and copying operations are in progress, is to employ two marking bitmaps, which we refer to as "previous" and "next" marking bitmaps. As will be explained below in more detail, the previous bitmap contains the marks for the last completed marking, while the next bitmap contains any marks for a marking that is still in progress or has not yet started. The mutator and collection operations rely only on the previous bitmap for identifying garbage objects, but they also update the next bitmap to help an in-progress marking to proceed, as will presently be discussed.

Now, some objects may have been allocated since the previous marking, so the fact that the previous marking did not mark a given object does not necessarily mean that the given object is garbage. But an unmarked object that was already allocated at the beginning of the previous marking is necessarily garbage. To take advantage of this fact, the illustrated embodiment keeps track of where objects had already been allocated when the previous marking began. Part of the approach that it uses to do this is to allocate space in each region contiguously, beginning at one end of its address range (the region's "bottom") and filling toward its other end. Additionally, it includes in each region's metadata a previous-top-at-mark-start field, which (with some exceptions that will be described below) identifies the location to which allocation in that region had reached when the previous marking began. In the illustrated embodiment, the region's bottom is the end having the lower address value. So, in the test that FIG. 5's block 64 represents, the collection operation concludes that an object is unreachable if its address is less than the contents of its region's previous-top-at-mark-start field and its bit in the previous-marking bitmap does not have the reachability-indicating value ($1_2$ in the illustrated embodiment).

Figure 7:
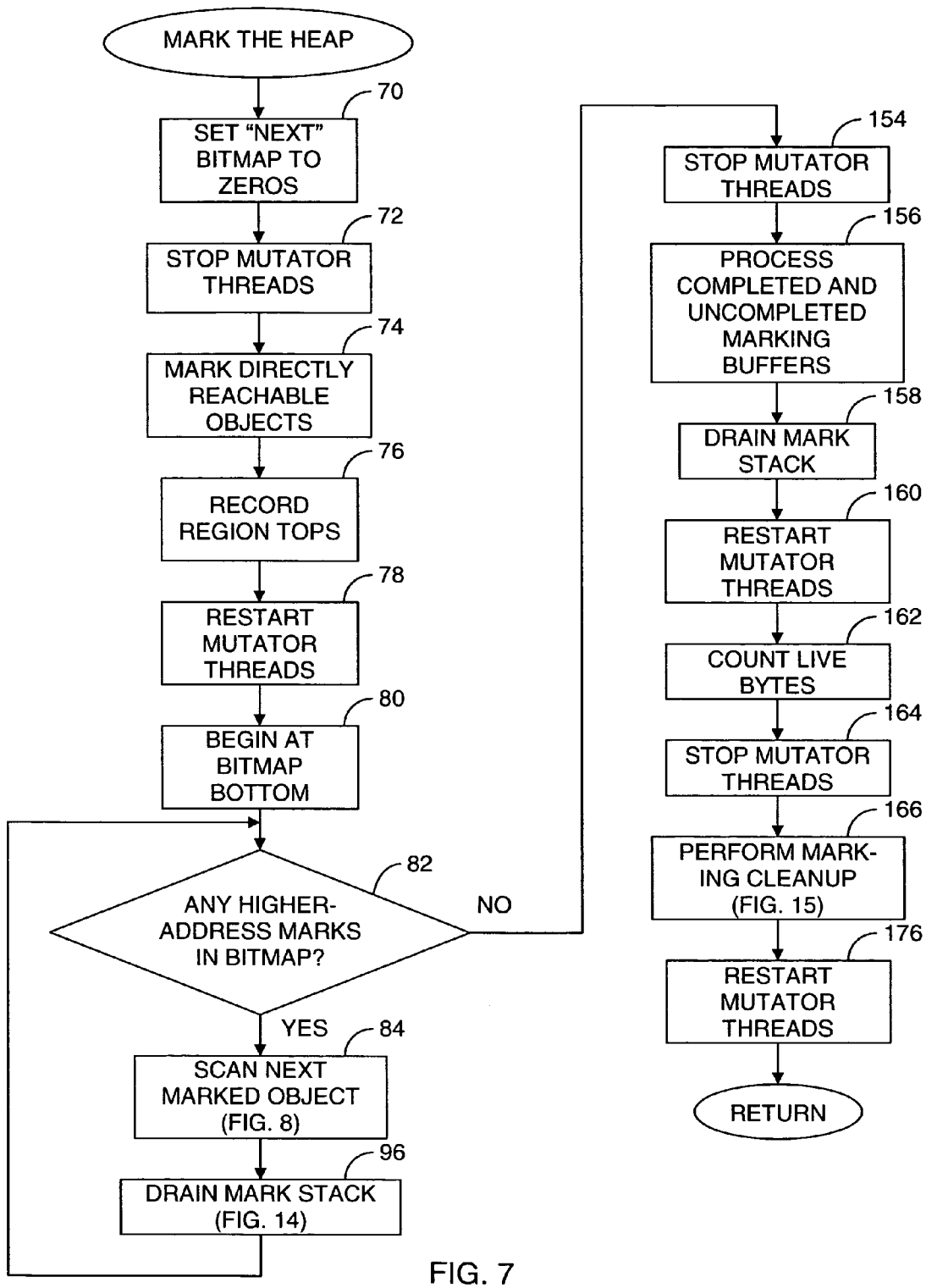
FIG. 7 is a flow chart of a marking operation.

FIG. 7 illustrates how the illustrated embodiment carries out this approach. Block 70 represents setting all of the next-marking bitmap's contents to zeros to indicate that the marking about to commence has not yet found any objects to be reachable. The marking operation begins with references in the registers, call stacks, etc., so the marking operation needs to be able to recognize which contents are references. To this end, it calls upon all threads to suspend themselves, as block 72 indicates, and they do so at "safe points," i.e., at instructions for which the compiler has created stack maps that tell which stack and register contents contain references. As block 74 indicates, it marks all locations referred to by the root-set references thus identified: it sets to $1_2$ the corresponding bits in the next-marking bitmap.

As was mentioned above, the current marking will, when it is completed, be reliable as to all objects still located where they were when the marking started. As was also mentioned above, each region's metadata also include a field that tells where the top was when the last completed marking started. This is the previous-top-at-mark-start field. For allocation purposes, each region's metadata also include "top" field to identify the location to which space in that region has been allocated so far. To recall the value to be placed in the previous-top-at-mark-start field when the current marking is eventually completed, the marking operation performs the block-76 operation of copying each region's top value into another metadata field, its next-top-at-mark-start field.

Having thus completed its use of the stack maps and recorded the values that the regions' tops had at the start of the marking, the marking operation signals the mutator threads to resume execution, as block 78 indicates. Most of the marking operation then proceeds concurrently with mutator execution.

In the illustrated embodiment, the marking operation's concurrent part comprises beginning at the bottom of the next-marking bitmap, as block 80 indicates, and proceeding upward, as block 82 indicates, to find each bit location that contains the reachability-indicating value ($1_2$ in the illustrated embodiment). That value means the corresponding heap location contains the head of a reachable object. When it finds such a location, it records the corresponding heap location in a "finger" variable that it maintains for this purpose, and, as block 84 indicates, it takes the first step in tracing the reference chain from each reference contained by the object whose head is at that location. Specifically, it scans the referent object in an operation that FIG. 8 depicts.

Figure 8:
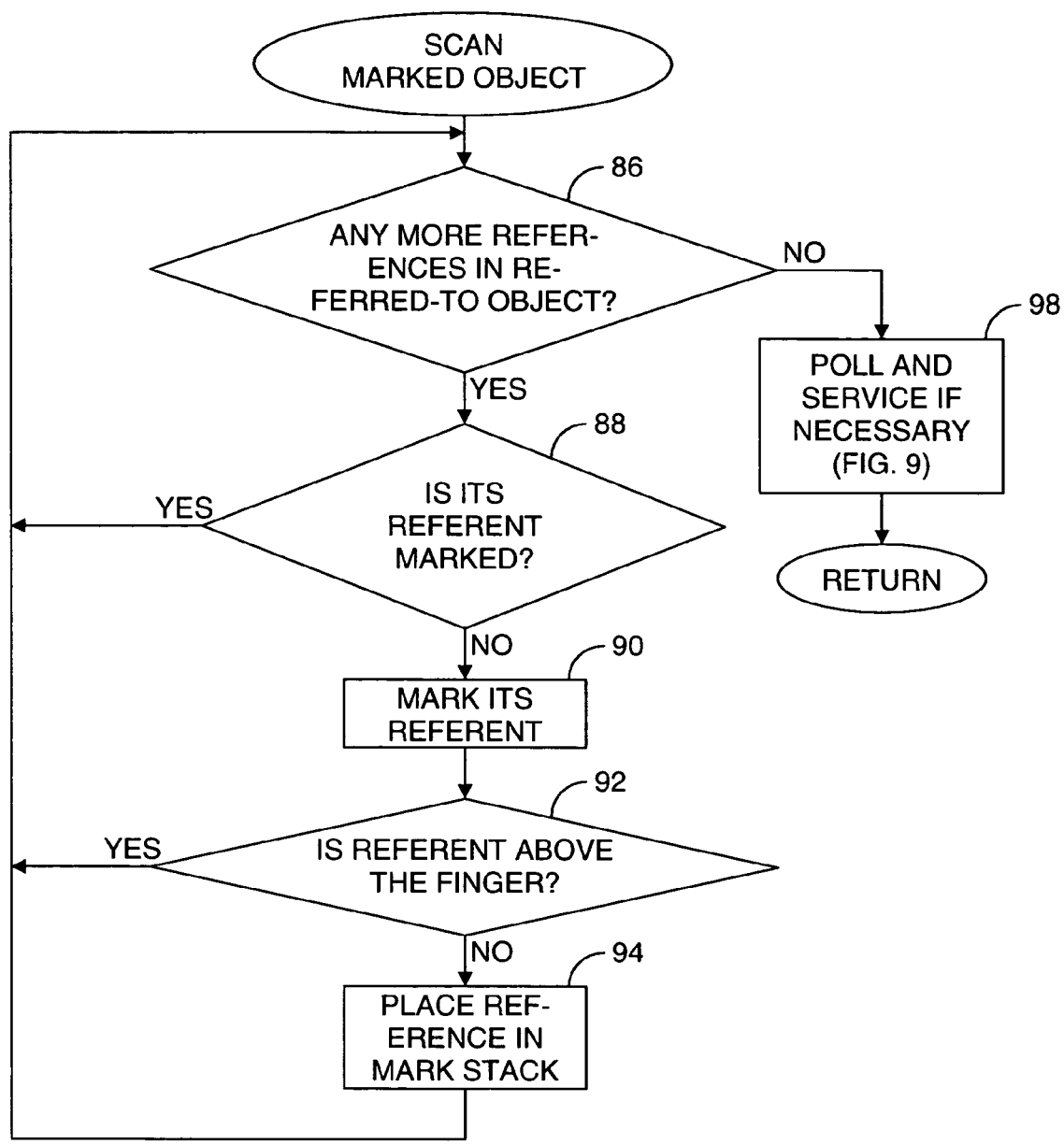
FIG. 8 is a flow chart of an object-scanning routine that the marking operation of FIG. 7 employs.

As FIG. 8's block 86 indicates, the scanning operation includes considering each of the references in the object being scanned. For each such reference, the marking thread determines, as block 88 indicates, whether the object referred to has already been marked. If it has not, the marking thread marks it and then, as will now be explained, ensures that any reference-graph sub-tree of which that object is the root gets traced. If the referent's address is higher than the finger value, then the marking operation of FIG. 7 will encounter it in due course and attend to tracing its sub-tree, so the thread does not need to take any further action to ensure tracing from that object. If the reference's value is less than the finger value, on the other hand, the marking thread pushes the reference value onto a mark stack, as block 94 indicates. As FIG. 7's block 96 indicates, the marking operation includes "draining" the mark stack by, as will be explained below, tracing reference chains from the references that the stack contains.

Figure 9:
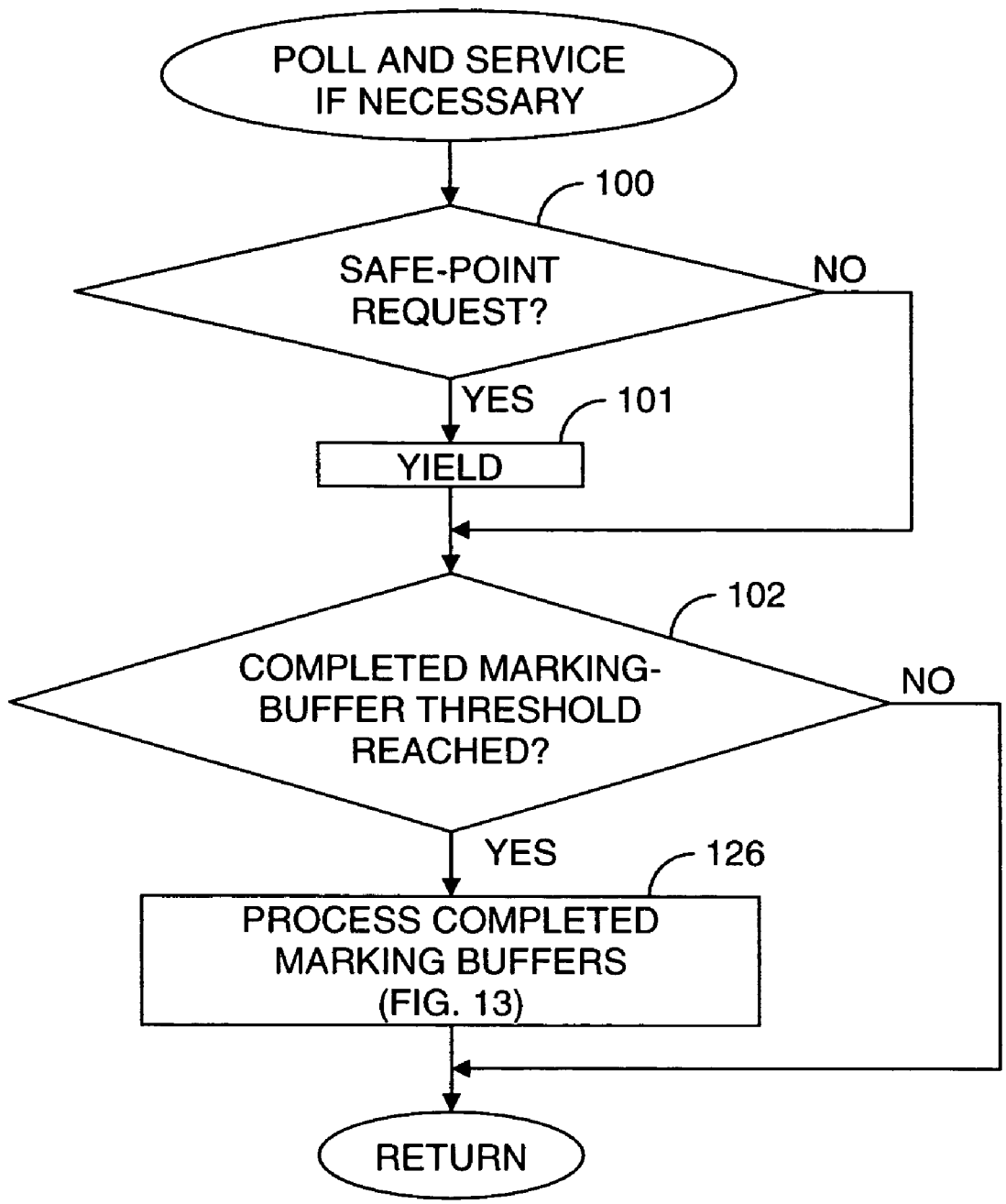
FIG. 9 is a flow chart of a polling routine also employed by the operation of FIG. 8.

Before we discuss mark-stack draining, though, we return to FIG. 8, in which block 98 indicates that the illustrated embodiment performs a polling operation each time it scans an object. FIG. 9 depicts that polling. FIG. 9's block 100 represents polling a "should pause" flag, which gets set by, e.g., a collection thread that needs other threads to pause for a collection interval. As block 101 indicates, the marking thread suspends itself if that flag has been set. Independently of whether it has, the marking thread also—possibly after having resumed execution—tests another, "process marking buffers" flag, as block 102 indicates. To understand that flag's meaning, it is necessary to digress to a discussion of "write barriers."

Remember in this connection that the marking operation's purpose is to detect garbage by taking a snapshot of the object-reference graph as it stood at the beginning of the marking; if, when marking began, there was no reference chain from the root set to an object that was in existence at that time, then that object is garbage. Since the marking operation traces those reference chains concurrently with mutator operation, though, the mutator can change a reference field that the marking operation has not yet processed. Now, for the mutator thus to have accessed that reference field, the object to which its previous contents referred was necessarily reachable when the concurrent marking began, so the reference-graph sub-tree of which it is a root was, too. Moreover, that sub-tree may still be reachable after that field's contents are changed. For example, the mutator could have copied the previous contents into a register—which the marking operation does not revisit after the marking operation's initial, non-concurrent part. If the marking operation consisted simply of simply tracing from the directly reachable objects, though, it could miss that sub-tree and thereby allow it to appear unreachable.

Figure 10:
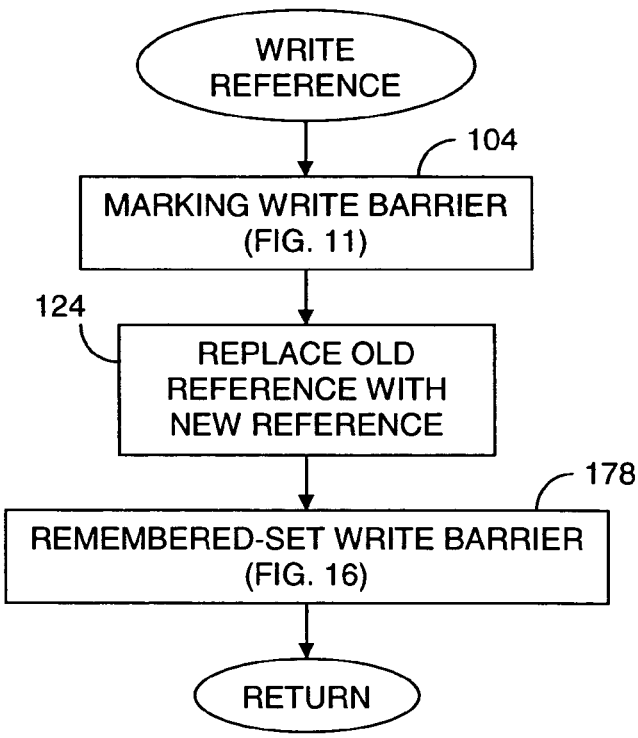
FIG. 10 is a flow chart depicting the routine that results when a compiler that targets the illustrated embodiment encounters source code calling for a reference to be written.

To avoid this possibility, a compiler targeting a system that employs the illustrated garbage collector will, in response to source code that calls for a reference-write operation, emit a write barrier, i.e., emit object code that communicates to the marking thread that such a write operation has occurred. FIG. 10 illustrates the operation that code emitted by the compiler may prescribe, its block 104 represents the write barrier used for marking support, and FIG. 11 depicts that writer barrier.

Figure 11:
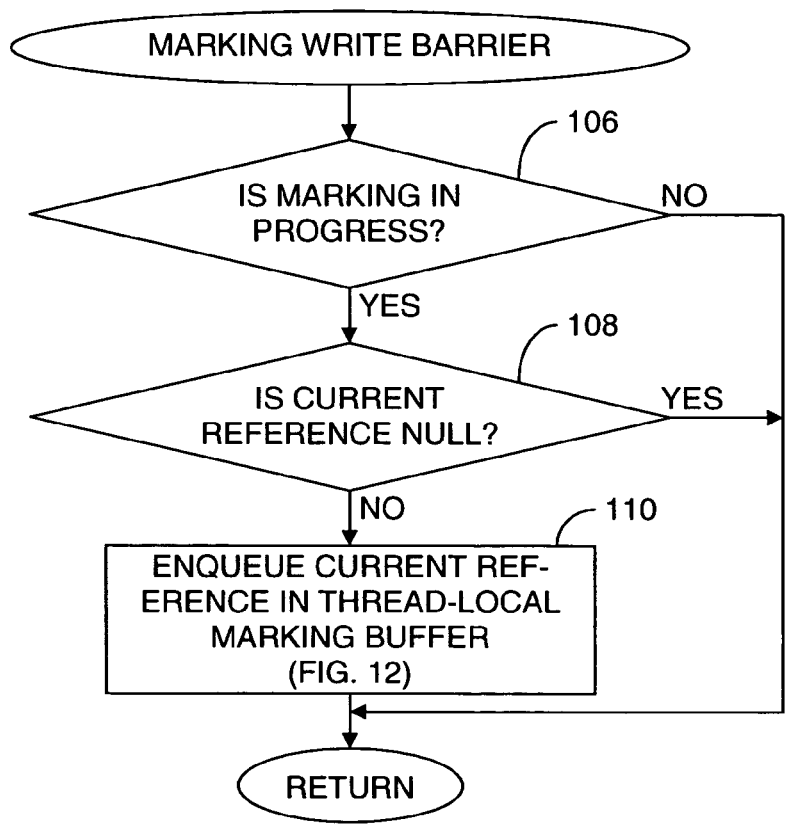
FIG. 11 is a flow chart of one of the write barriers included in the FIG. 10 routine.

The mutator needs to communicate with the marking operation only if there is one in progress, so the write barrier tests for that condition, as FIG. 11's block 106 indicates. This test may be performed on the value of a global variable that the marking thread toggles at the beginning and end of a marking, but there may be some value in having the marking thread instead toggle a similar flag in each mutator thread's execution environment. In any event, if a marking operation is currently in progress, the write barrier reads the value that the target reference field contains before the update, and, as block 108 indicates, it determines whether that value is NULL, i.e., whether it is a distinguished value, typically zero, indicating that the reference refers to no object at all. If it is, the field does not contain the root of a reference chain, so the mutator does not need to apprise the marking thread of that field's change. Otherwise, as blocks 108 and 110 indicate, the write barrier places the original reference-field value in a buffer containing a list of such values.

Figure 12:
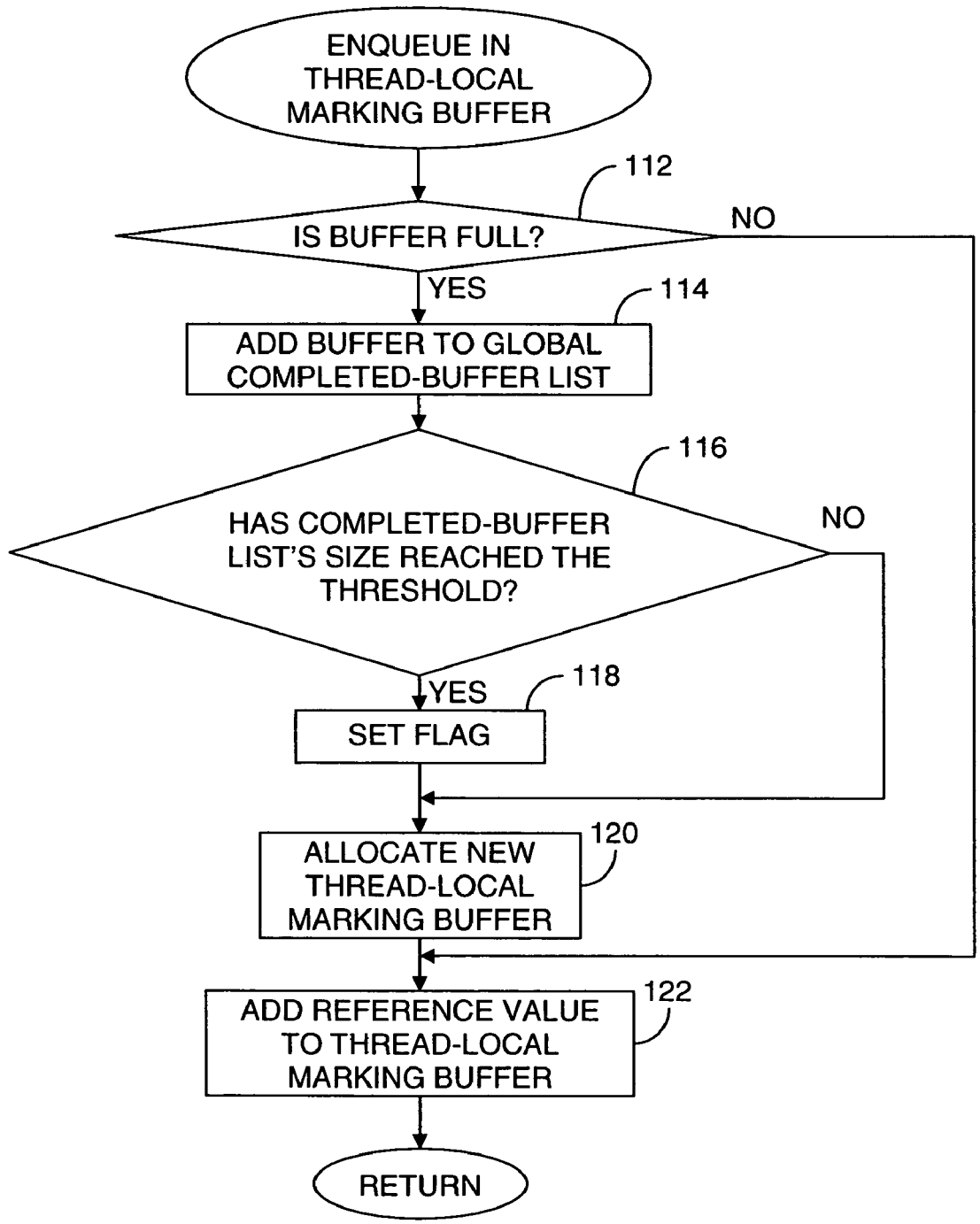
FIG. 12 is a flow chart of an operation performed by the routine of FIG. 11 to inform the garbage collector of a reference that has been overwritten.

FIG. 12 depicts in more detail the operation that FIG. 1's block 110 represents. The illustrated embodiment minimizes inter-thread contention by having each mutator thread's metadata include a pointer to a marking buffer to which no other mutator thread writes and, ordinarily, the marking thread does not have access. If that thread-specific buffer becomes full, though, the mutator thread places it on a global completed-marking-buffer list, as blocks 112 and 114 indicate. This is a common list, protected by a lock, to which all mutator threads add their completed buffers.

When that list becomes long enough, the marking thread needs to read it. So, as block 116 indicates, the mutator determines whether adding its buffer has made that list's length reach a predetermined threshold. If it has, the mutator sets a flag that the marking thread checks in the operation mentioned above in connection with FIG. 9's block 104. Block 118 represents setting that flag.

Independently of whether the threshold was reached, the mutator thread allocates a new thread-local marking buffer, as block 120 indicates, if it added the previous one to the common list. And, in any event, the mutator adds the reference field's previous value to its marking buffer, as block 122 indicates. As FIG. 10's block 124 indicates, the mutator then updates the field that was the target of the reference-write operation.

Figure 13:
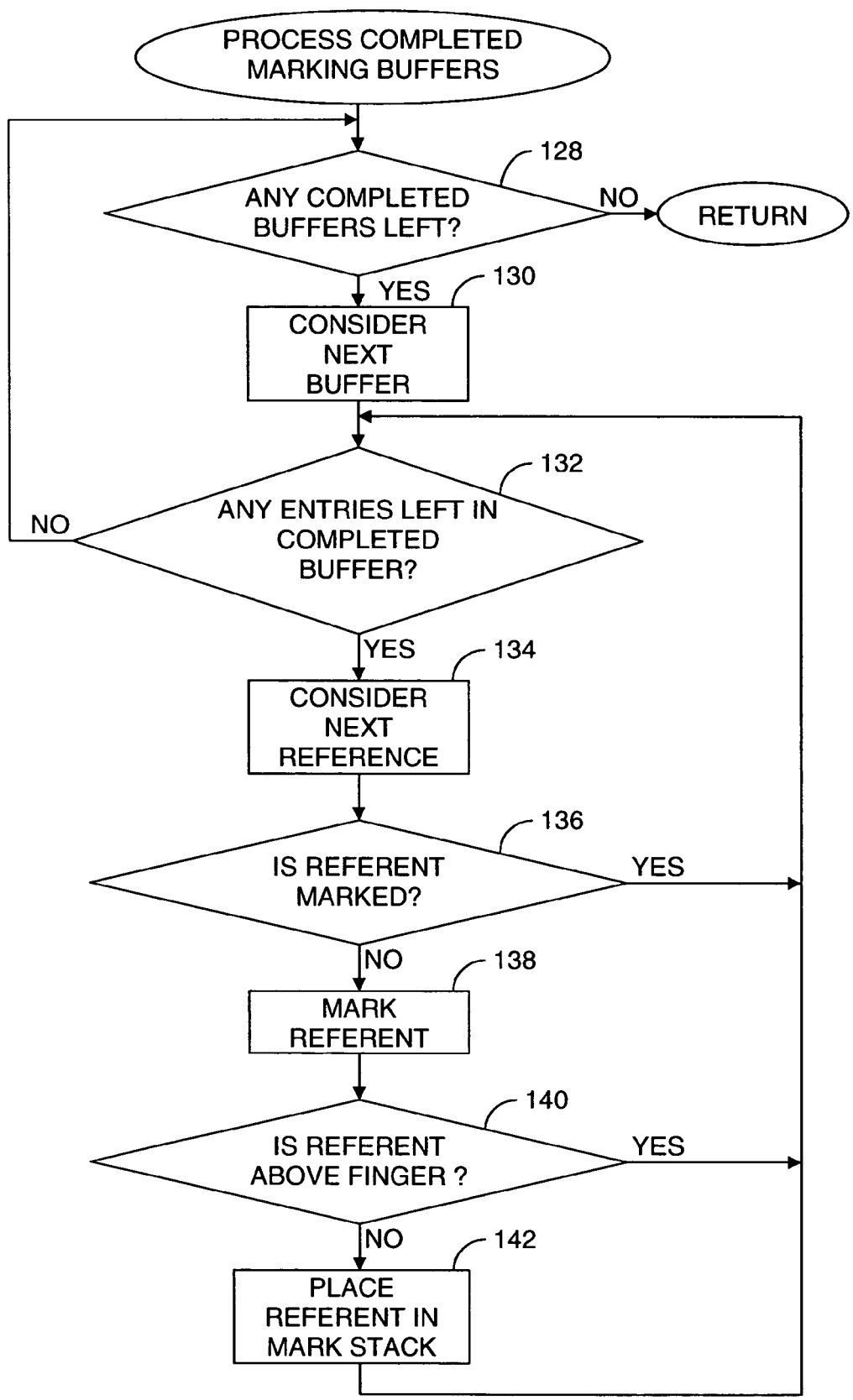
FIG. 13 is a flow chart of a routine that the illustrated embodiment's garbage collector employs to adjust its marking operation in response.

We now return to FIG. 9, which represents the polling operation that the marking thread performs in the course of tracing reference chains. If the test that block 102 represents determines that the mutator threads have completed enough marking buffers, then the marking thread processes those buffers. Block 126 represents that operation, which FIG. 13 illustrates. As blocks 128, 130, 132, and 134 indicate, the marking thread considers the entries in each buffer in the list in turn until it has processed all of them. For each entry, the marking thread marks the referred-to object if it is not already marked, as blocks 136 and 138 indicate. And, as blocks 140 and 142 indicate, it places on the mark stack the address of any object it thus marks if that object's address is less than the finger value.

Figure 14:
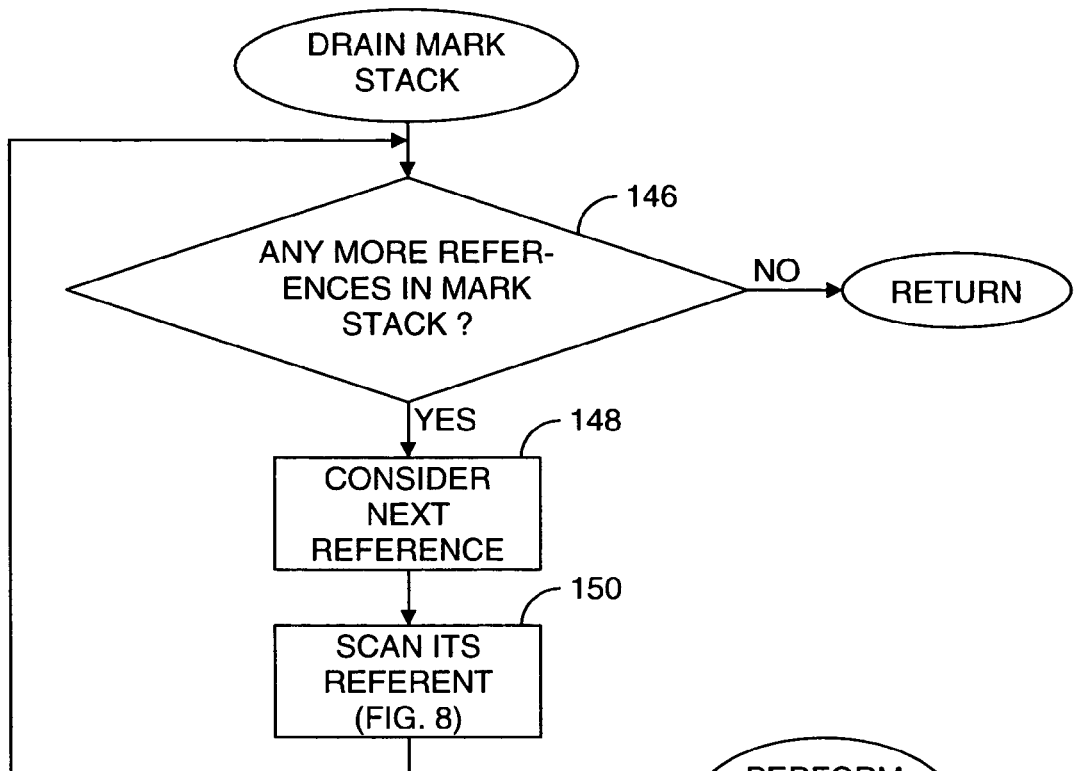
FIG. 14 is a flow chart that depicts the way in which the collector processes entries in a list of marked objects to be scanned.

With the polling operation of FIG. 9 completed, FIG. 8's object-scanning operation ends, and the marking operation illustrated in FIG. 7 proceeds to drain the mark stack, as that drawing's block 96 indicates and FIG. 14 illustrates in more detail. As FIG. 14's blocks 146 and 148 indicate, that operation repeatedly pops references from the mark is stack until none is left. And, as block 150 indicates, it scans each referred-to object in the manner described above in connection with FIG. 8.

As FIG. 7's blocks 82, 84, and 96 indicate, the concurrent part of the marking operation continues until the top of the next-marking bitmap has been reached and the mark stack has been drained. At that point, some entries may still remain in completed marking buffers as well as in (thread-specific) marking buffers that are not yet full. That is, there may still be some reference-field contents that were in existence at the marking's start but that the marking operation has not yet considered. To make sure that it has taken a complete snapshot, the marking operation signals all mutator threads to suspend themselves, as block 154 indicates. As block 156 indicates, it then processes all of the marking buffers as before, with the exception that it additionally processes the marking buffers that are not yet full and that therefore have not been added to the completed-marking-buffer list. Since this results in mark-stack entries, the mark stack is then drained again, as block 158 indicates.

Having thus completed marking all objects that were live at the beginning of the marking operation, the marking thread can determine a maximum for the number of live bytes in each region. It starts with a zero-live-byte value for each region. Then, for each marked bitmap entry, it adds the size of the corresponding object to the live-byte total for the region in which that object starts. This operation can largely be performed concurrently with mutator operation. As blocks 160 and 162 indicate, therefore, the marking thread signals the mutator threads to resume execution before it starts counting live bytes.

Figure 15:
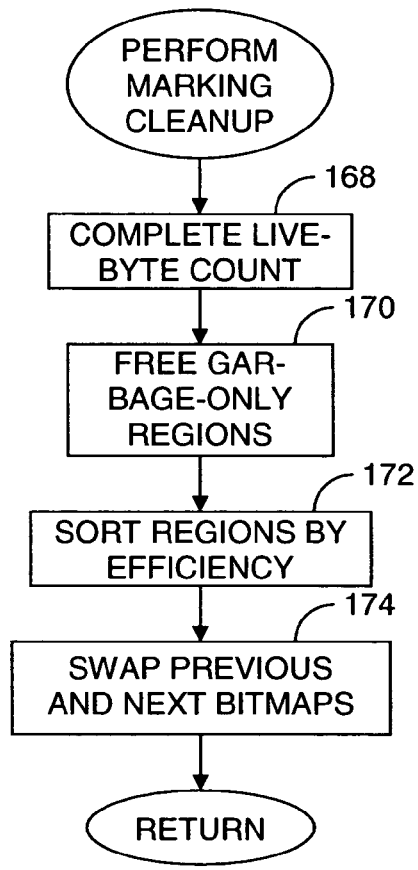
FIG. 15 is a flow chart that depicts a cleanup routine that the collector performs at the end of its marking operation.

When the concurrent live-byte counting has been completed, the mutator needs to perform a final, cleanup operation with the mutator threads suspended, as blocks 164 and 166 indicate. FIG. 15 depicts the cleanup operation. As was explained above, collector copying can interrupt the marking thread's concurrent operations. Typically, a collector-copying operation includes the collector's copying reachable objects into some regions above what had been those regions' tops. As will be seen, the evacuation operation includes moving the evacuated objects' marks with the objects. And, in contrast with the mutator's operation of allocating objects in new-allocation regions, the collector's operation of evacuating objects into evacuation regions includes, for reasons that will become apparent in due course, raising those regions' next-top-at-mark-start values. If this happens during the concurrent counting that FIG. 7's block 162 represents, the maximum-live-byte value will have changed. So the marking thread completes the live-byte count while other threads are suspended, as FIG. 15's block 168 indicates.

In the process, the marking thread may encounter regions for which the maximum number of live bytes is zero, i.e., regions that are all garbage. Those regions can be reclaimed forthwith, without evacuating reachable objects, so the marking thread does so, as block 170 indicates. (Incidentally, this is the only way in which the illustrated embodiment reclaims regions occupied by objects larger than three-quarters of a normal region size. As was mentioned above, such objects are allocated respective exclusive regions, and the illustrated embodiment never includes such regions in the collection sets.)

With a maximum-live-byte count determined for the regions that contained objects at the beginning of the marking operation, the marking thread can make the efficiency estimates mentioned above, and it can therefore sort the regions by their respective estimated collection efficiencies, as block 172 indicates. The regions whose estimated efficiencies are highest will be considered for membership in the collection set when the time thereafter comes for a copying collection. When that time comes, efficiency estimates will be updated for these regions to take into account changes in remembered-set size, and the resultant efficiencies are used as the basis for the final collection-set selection.

Having thus completed the actual marking and live-byte counting, the marking thread swaps the values in the fields that contain the pointers to the previous- and next-marking bitmaps: the next-marking bitmap becomes the previous-marking bitmap. For each region, it also adopts the next-top-at-mark-start value as the previous-top-at-mark-start value. Block 174 represents performing those operations, after which, as FIG. 7's block 176 indicates, the mutator operation signals the suspended threads to resume. This completes the marking operation.

When the collection set has been selected for a given collection increment, its constituent regions are collected: the potentially reachable objects are evacuated, and the regions are claimed for reuse. In the collection increments, the collector evacuates objects only if they are not demonstrably unreachable. Objects that were not found to be reachable in the previous marking are clearly unreachable, so the collector does not evacuate them. But an object that was reachable at the last completed marking may become unreachable in the interim; the reference(s) that made it reachable at the time of the marking may since have been overwritten to point elsewhere. Such an object can be identified as garbage if no reference outside the collection set refers to it directly or through other collection-set objects. As was mentioned above, the collection increment does not include scanning all references outside the collection set to make this determination. Instead, its scanning of the heap for this purpose is limited to locations that "remembered sets" associated with the collection-set regions identify as having contained references to the respective regions' objects. We now turn to the manner in which the remembered sets are maintained.

Figure 16:
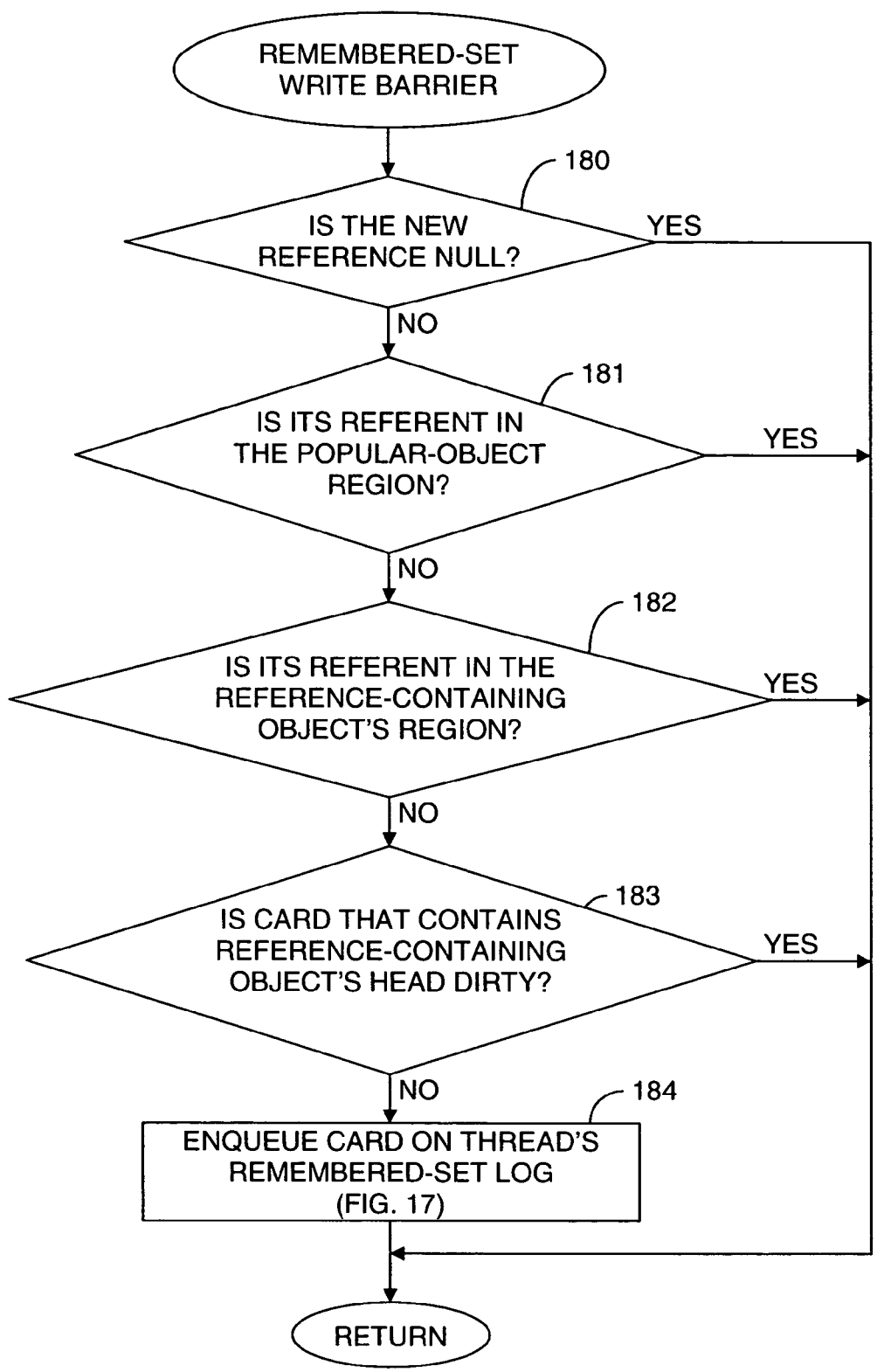
FIG. 16 is a flow chart of another write barrier executed by a mutator that writes a reference.

As was explained above in connection with that FIG. 10's block 104, a mutator thread that writes a value in a heap reference location often records that location's previous value so that the collector can use it for marking purposes. To assist in remembered-set maintenance, the mutator thread often additionally records the reference location itself. FIG. 10's block 178 represents a write barrier for that purpose, and FIG. 16 illustrates that write barrier.

Now, the purpose that a given region's remembered set serves is only to list locations in other regions where references to the given region's objects have been found. So there is no need to record reference locations that contain NULL values, since they contain no valid references. As will be explained below, moreover, there are some, "popular-object" regions for which the illustrated embodiment does not maintain remembered sets, so the locations of references to objects in those regions do not have to be recorded. And, since remembered sets list only inter-region references, not intra-region references, intra-region references' locations require no recording, either. As FIG. 16's blocks 180, 181, and 182 indicate, the write barrier therefore tests for those conditions and bypasses reference-location recording if any of them prevails. The following pseudocode is an example of instructions that a compiler may emit for this purpose after a write operation that copies a value from rY into a field at offset FieldOffset in an object located at the address contained by register rX:

```
1 rTmp := rX XOR rY
2 rTmp := rTmp >> LogOfHeapRegionSize
3 // Below is a conditional move instruction:
4 if (rTmp == 0) goto filtered
5 rTmp := POPULAR_OBJECT_BOUNDARY
6 if (rY < rTmp) goto filtered
7 call rs_enqueue(rX)
8 filtered:
```

The first two lines determine whether the referent and reference-containing object are in the same region. If they are, the fourth line causes the fifth- through seventh-line instructions to be skipped. Otherwise, the mutator thread determines whether the reference refers to a location in a popular-object region. In the illustrated embodiment, it does this by determining whether that location is below a popular-object-region boundary, as the fifth and sixth lines indicate. If the referent is indeed in a popular-object region—or if the reference is NULL—the thread skips the seventh-line instruction. Otherwise, it executes that instruction, which tells the collector that a reference has been written and where the writing occurred.

In the illustrated embodiment, the way in which the collector keeps track of where references have been written is to use a card table. The collector considers the heap to be divided for this purpose into cards of, say, 512 bytes each, and the card table includes for each card an entry that indicates whether a cross-region reference has been written in that card since the last remembered-set update. As block 183 indicates, the mutator thread determines whether the entry for the reference's card already indicates that the card is "dirty," i.e., whether a reference has been written there. If so, the entry does not have to be changed.

Figure 17:
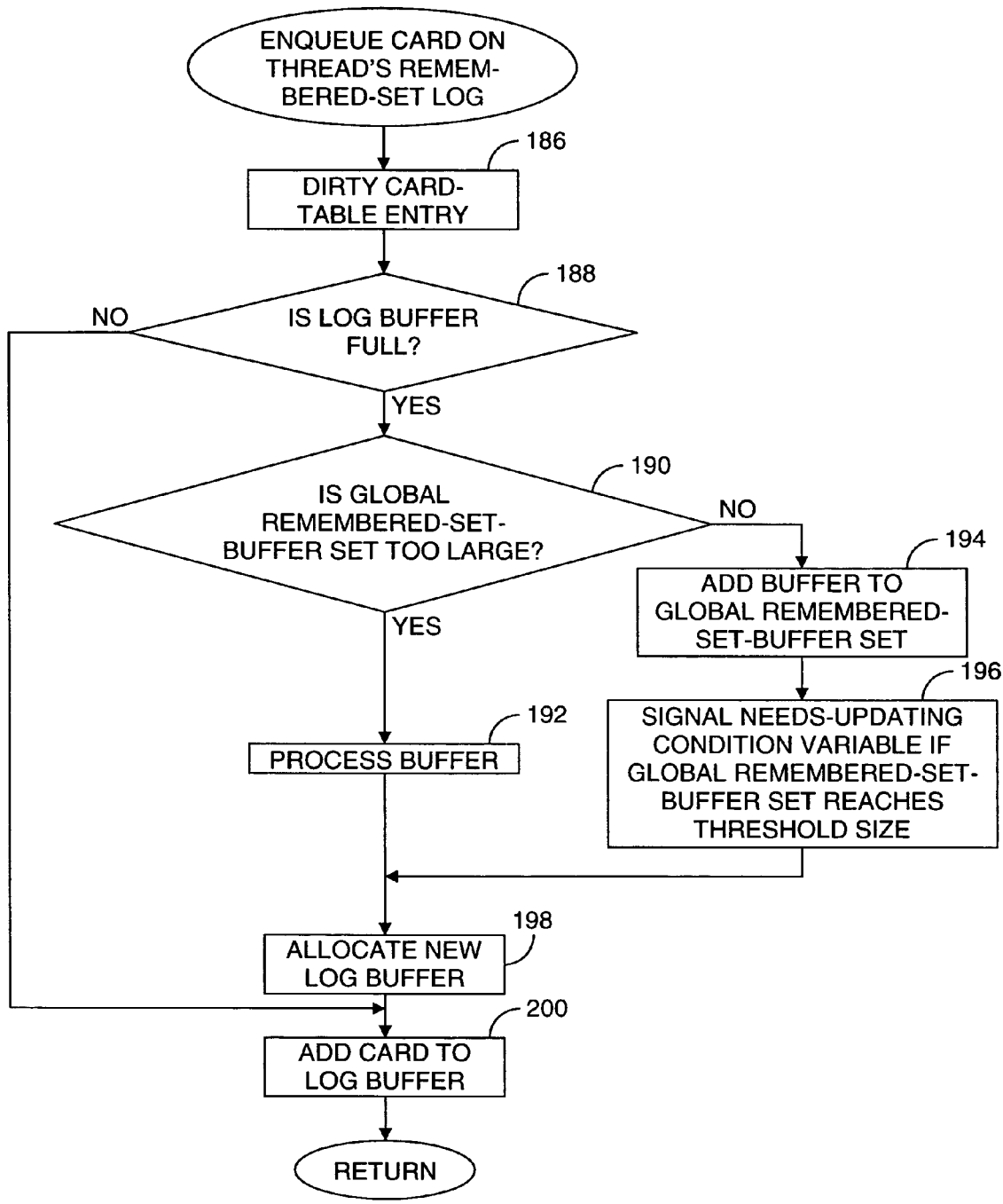
FIG. 17 is a flow chart depicting a routine included in the write barrier of FIG. 16.

Otherwise, the card-table entry needs to be set to the dirty-indicating value. The collector does this in an operation that block 184 represents and FIG. 17 depicts in detail. Block 186 represents actually placing that value in the card table, and the remaining operations are directed to facilitating the work of a thread that concurrently updates remembered sets in response. To this end, the illustrated embodiment provides each mutator thread with a dedicated log in which it lists the cards whose entries it has found to need revision.

The illustrated embodiment employs fixed-size buffers to contain the threads' respective dedicated remembered-set logs, and FIG. 17's block 188 represents determining whether the thread's log buffer is full. If it is, the mutator needs to allocate a new buffer. Before it does so, though, it places the full buffer on a global list of such buffers, to which all mutator threads add their full remembered-set-log buffers.

Although not apparent in FIG. 5, collection operations will typically involve some use of those buffers to update the remembered sets before the search for inter-heap-region references, which that drawing's block 62 represents. To limit the amount of such work that the collection operation has to do, the illustrated embodiment provides a remembered-set-updating thread to update the remembered sets by processing the global list's entries, in a manner that will be discussed in due course, concurrently with mutator operation. But the mutator may occasionally update references at a pace that is too fast for the remembered-set-updating thread: if that thread were to handle the between-collection-interval remembered-set updating alone in such cases the amount of remembered-set updating remaining at the beginning of a collection pause would make the pause too long. So the mutator thread tests for this condition, as FIG. 17's block 190 indicates, and, as block 192 indicates, it processes the buffer on its own, in a manner that will become apparent below, if the buffer list is too long. Otherwise, as block 194 indicates, it adds its buffer to the global list. This may involve contention with other threads, but that contention should occur only infrequently.

Now, a small amount of that updating during collection pauses is acceptable, so the collector's concurrent remembered-set-updating thread does not begin execution until the global list includes a minimum number of buffers. When the list reaches that minimum, the mutator thread informs the remembered-set-updating thread it has, and FIG. 17's block 196 represents doing so.

As was mentioned above, the mutator has to allocate a new buffer if its previous buffer was full, and block 198 represents that operation. Independently of whether it was necessary to allocate a new buffer, the mutator adds the card to the list in the current buffer, as block 200 indicates.

Figure 18:
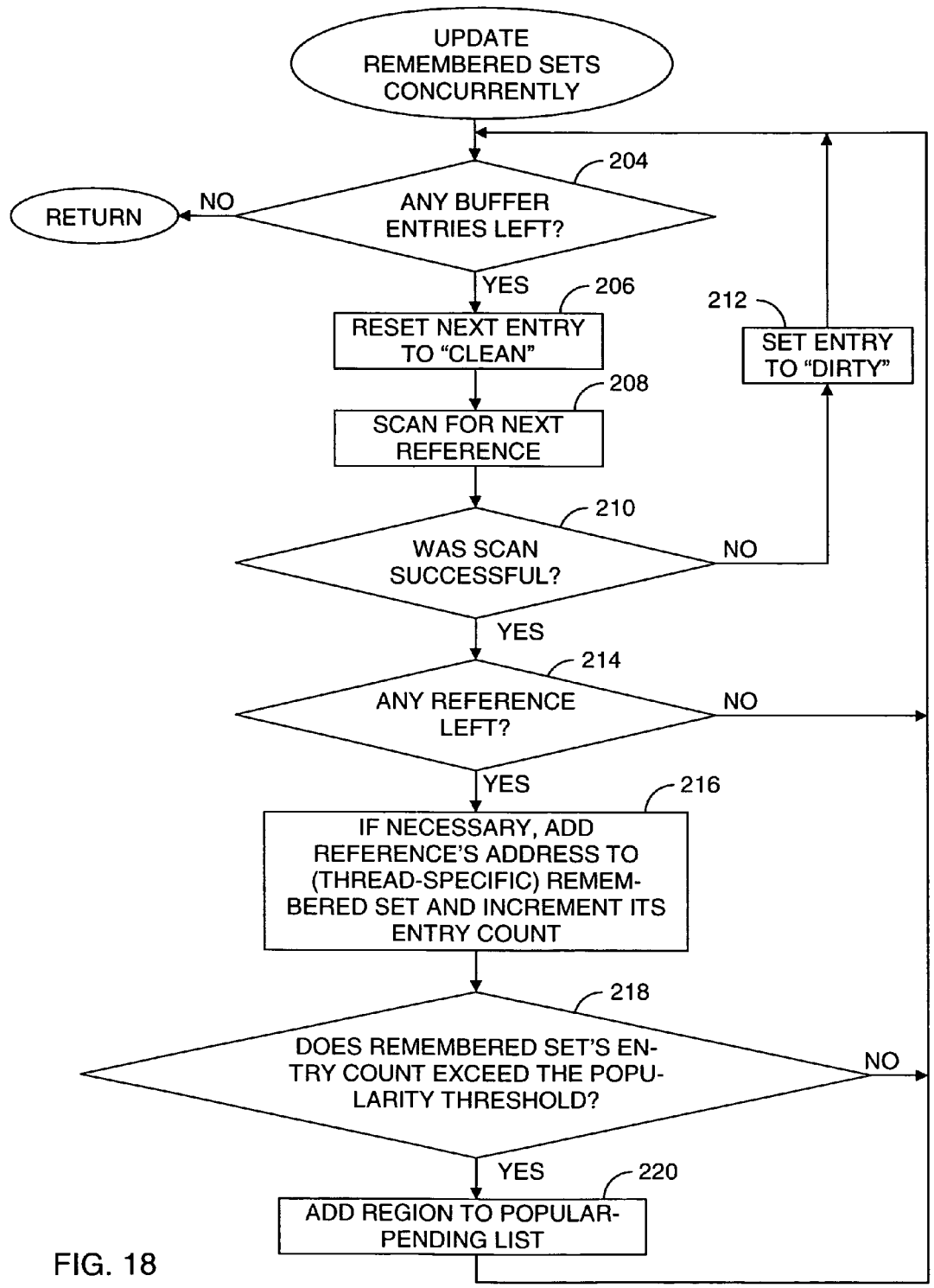
FIG. 18 is a flow chart depicting an operation that a remembered-set-updating thread executed by the collector performs.

When a mutator signals the remembered-set-updating thread that the list of remembered-set logs requires processing, the remembered-set-updating thread begins a concurrent remembered-set-updating operation, which FIG. 18 depicts. Basically, the remembered-set-updating thread considers all cards identified by entries in any of the listed buffers, as block 204 indicates. When it considers a card, its first action is to set the corresponding card-table entry to the "clean" value, as block 206 indicates, so that the mutator will record any further reference-write operations that take place in that card after the remembered-set-updating thread begins scanning the card. As block 208 indicates, it scans the card for references. In the illustrated embodiment, space within the card may have been so allocated that parsing the card for reference locations will be particularly time-consuming. If that happens, the remembered-set-updating thread avoids expending the time that parsing would require. Instead, it simply considers the scanning operation unsuccessful and marks the card dirty again, as blocks 210 and 212 indicate, and proceeds to the next card.

We digress at this point to mention that some embodiments may employ an approach to implementing remembered-set logs that avoids the parsing problem and may therefore be considered advantageous in some cases. Whereas the illustrated embodiment records the modified reference's location coarsely, by making an entry identifying only the card in which it (or, say, the head of the object that contains it) is located, some embodiments may instead use a sequential-store buffer that logs the head of the object containing the reference or even the reference's address. The remembered-set-update thread in such an embodiment does not need to perform all of the parsing required of the illustrated embodiment's. Of course, such an arrangement makes it necessary for the write barrier to make entries more frequently. But a way of containing this effect to an extent is for each mutator thread to maintain some small number of cache fields for remembering the locations where the heads of the objects containing the most-recently modified references are located. In place of the operation represented by FIG. 16's block 183, such an embodiment would check the cache value to determine whether the reference being modified is in the same object as the last cross-region reference modified by that thread. If it is, the write barrier refrains from logging it, because the remembered-set-updating thread will scan that object for all its references anyway.

In the illustrated embodiment, though, that thread has to parse the card, and in most cases it succeeds. It can therefore determine whether the card contains any reference locations that the thread has not yet scanned. Block 214 represents making that determination. If there are none, the thread returns to the buffer list to determine whether the listed buffers contain any entries that it has not processed. As block 216 indicates, it otherwise makes an entry, if necessary, in a remembered set for the region that contains the object to which the card's next reference refers, and it increments an entry count maintained for that remembered set.

As was observed above, an entry will not be necessary if the reference and the object to which it refers are located in the same region. Additionally, the illustrated embodiment implements remembered sets as hash tables, which facilitate determining whether an existing reference location has already been recorded in the remembered set. If it has, then the remembered-set-updating thread does not enter it.

The remembered-set-updating thread then determines whether the region's reference count has reached a region-"popularity" threshold, as block 218 indicates. Before we discuss the reason for doing so, recall that the mutator's write-barrier routine depicted in FIG. 17 can itself include, as that drawing's block 192 indicates, processing a buffer essentially in the manner that the remembered-set-updating thread does. Moreover, while it is intended that most of the remembered-set updating be performed concurrently with mutator operation, some of it will be performed at the beginning of a collection pause. For both of these reasons, there will be times at which more than one thread will be performing the updating. To avoid the cost of dealing with contention among these threads for access to the remembered sets, the illustrated embodiment maintains a plurality of remembered sets for each of the regions, and each thread concurrently performing updating claims a different one of each region's remembered sets to which to add entries. So, to determine the region's popularity, the thread totals the entry counts for all of the region's remembered sets.

If a region's count exceeds a predetermined threshold, the illustrated embodiment infers that the region may be on its way to having an excessively large remembered set, one that will make collection and continued maintenance expensive. The remembered-set-updating thread therefore steps in to avoid much of that cost before the remembered set becomes too large. Specifically, it adds the region to a list of "popular-pending" regions, as block 220 indicates, and sets a flag in response to which a special collection increment will in due course be performed.

Figure 19:
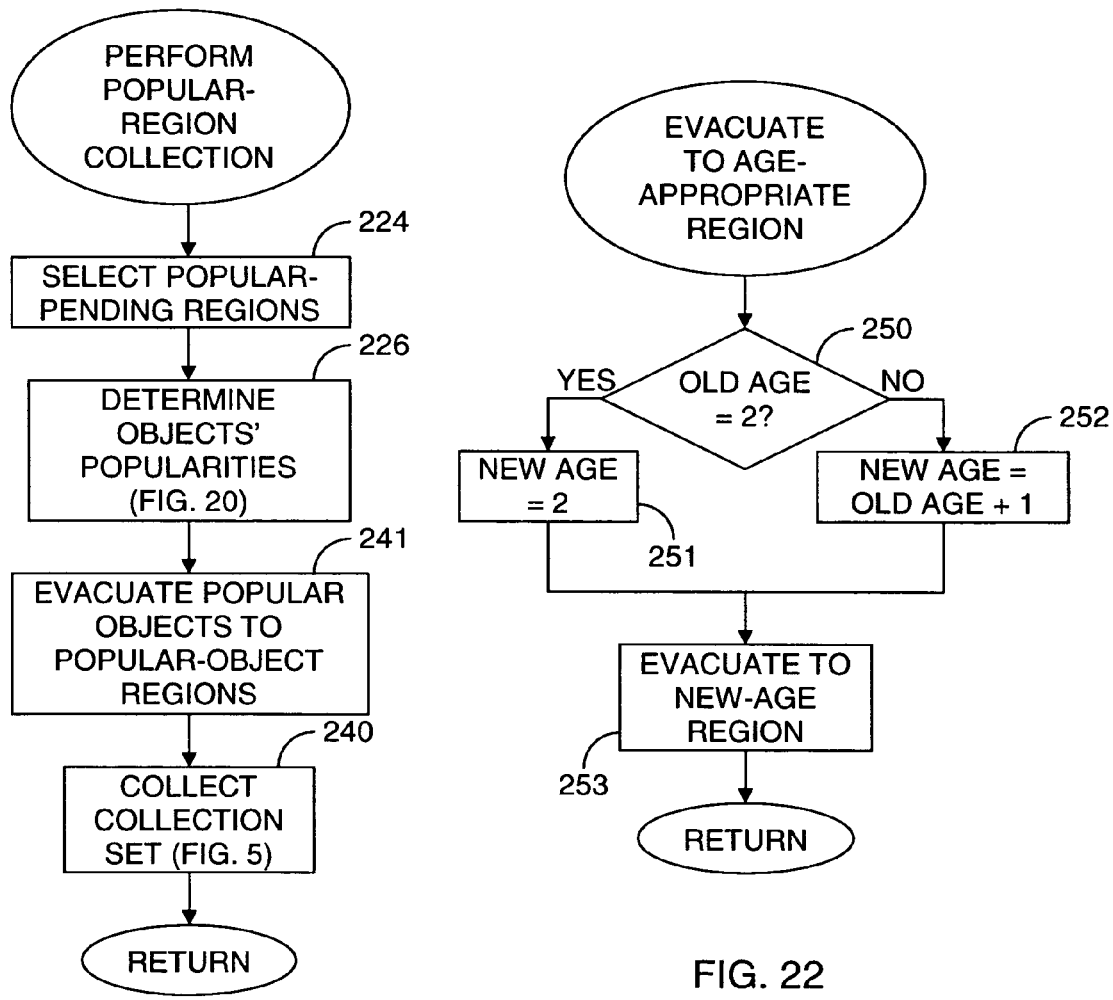
FIG. 19 is a flow chart of the way in which the illustrated embodiment collects certain "popular-pending" heap regions.

FIG. 19 depicts such a special collection increment's salient features. Whereas the garbage collector makes the collection-set selection in most collection increments in accordance with the efficiency ordering described above, it makes that selection in special increments from one or more of the regions on the popular-pending list, as block 224 indicates, independently of whether other regions, not on the list, will result in more-efficient collection.

Figure 20:
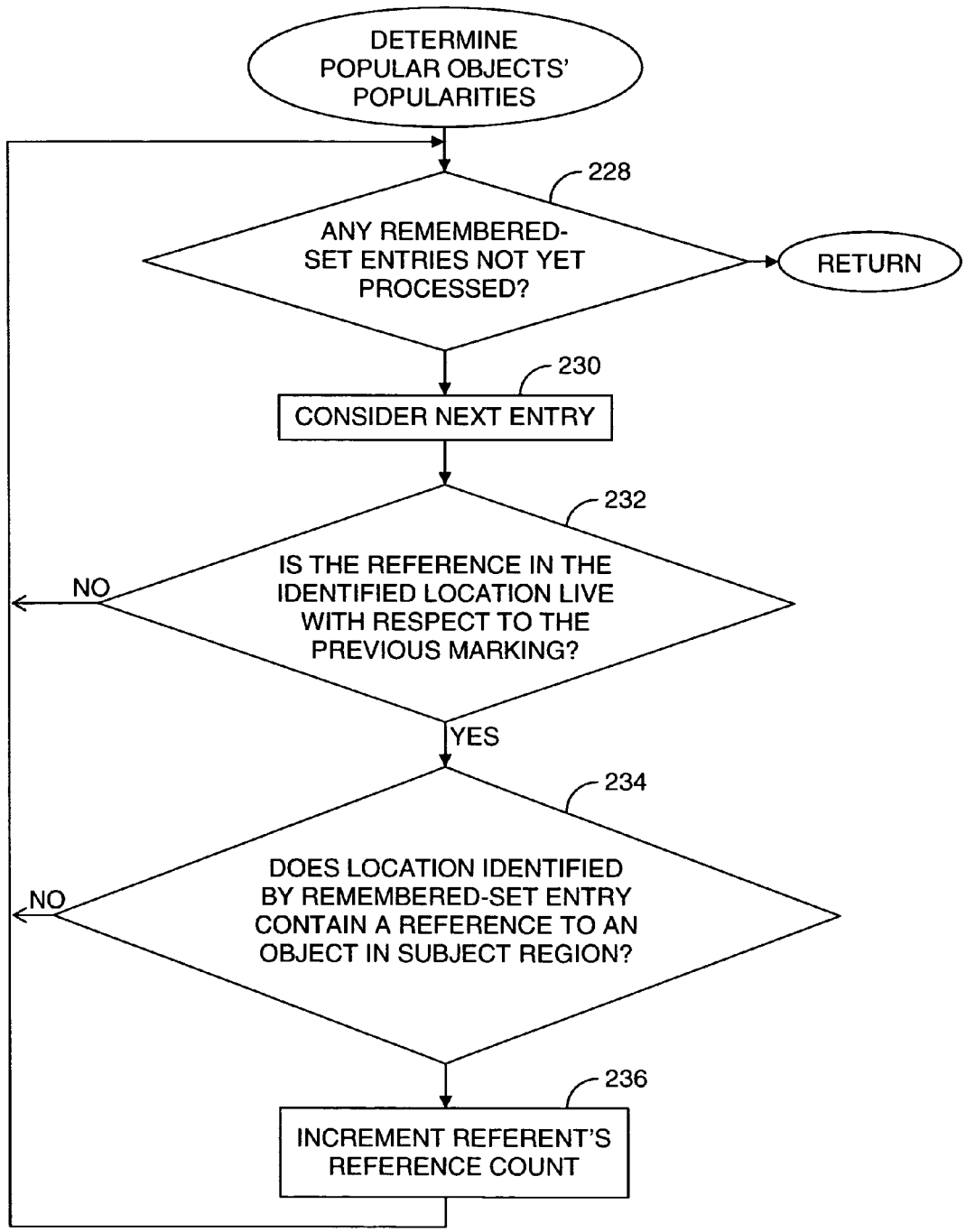
FIG. 20 is a flow chart depicting an operation employed in that routine to determine objects' popularities.

Another difference from other collection pauses is that the special collection includes a preliminary pass through the collection-set regions' remembered sets to determine whether any of its objects are particularly popular. For each collection-set object, that is, it counts how many references refer to it. For this purpose the illustrated embodiment temporarily allocates a "shadow region" for each collection-set region and keeps a count for each collection-set object in the location corresponding to the one in which that objects begins. Block 226 represents the popularity-determining operation, which FIG. 20 depicts in more detail.

As blocks 228 and 230 indicate, the collector proceeds through all of the entries until it has completed that first pass through all of them. As block 232 indicates, the collector determines for each remembered-set entry whether the object containing the reference in the location thereby identified is "live with respect to the previous marking." It considers an object live with respect to the previous marking if (1) the object is marked explicitly in the previous-marking bitmap or (2) it is implicitly marked in the sense that its address is above the previous-top-at-mark-start value for the region containing that object. An object that is not live with respect to the previous marking can reliably be concluded to be unreachable, so a reference that such an object contains does not cause the collector to increment any collection-set object's reference count.

If the reference-containing object is not thereby found to be unreachable, the collector next determines, as block 234 indicates, whether the reference refers to a collection-set object. If it does, the collector increments the object's reference count, as block 236 indicates. In the illustrated embodiment, multiple concurrent threads perform the counting operation, so they use atomic compare-and-swap operations for reference-count incrementing.

Having finished the reference-count operation, the collector makes another pass through the collection set. In that pass, as FIG. 19's block 238 indicates, it evacuates to special, popular-object regions the collection-set objects whose reference counts exceed a popular-object threshold. As was mentioned above in connection with FIG. 16's block 181, the illustrated embodiment does not maintain remembered sets for objects located in such regions, so a remembered-set write barrier can simply return without recording the write operation if it finds that the written reference refers to an object located in such a region. As the write-barrier pseudocode above indicated, the write barrier's determination of whether the object is located in a popular-object region can be made easily if, as in the illustrated embodiment, allocation is so arranged that all addresses below a certain address value are reserved for popular objects.

We digress at this point to note that the illustrated embodiment never collects the popular-object regions; once it identifies an object as popular, it never reclaims the memory occupied by that object. This is acceptable in most programs, since objects that at some point become popular rarely become unreachable thereafter. Still, some implementations may provide for reclaiming once-popular objects' memory, and this can be done without maintaining remembered sets for popular-object regions and thereby suffering the attendant write-barrier overhead. At the end of the heap-wide marking, for example, the collector can sweep the popular-object regions for unmarked objects. It can do so concurrently with mutator execution, and, if it does not additionally compact the popular-object regions, it can simply add the unmarked objects' memory blocks to a free list, also concurrently with mutator execution.

When the collector has evacuated all popular objects, it scans each object thus evacuated for references to other collection-set objects. In a manner that will be described below in connection with FIG. 21, it evacuates to normal regions any objects thereby referred to. As FIG. 19's block 240 indicates, the collection operation then proceeds generally as was described in connection with FIG. 5.

Figure 21:
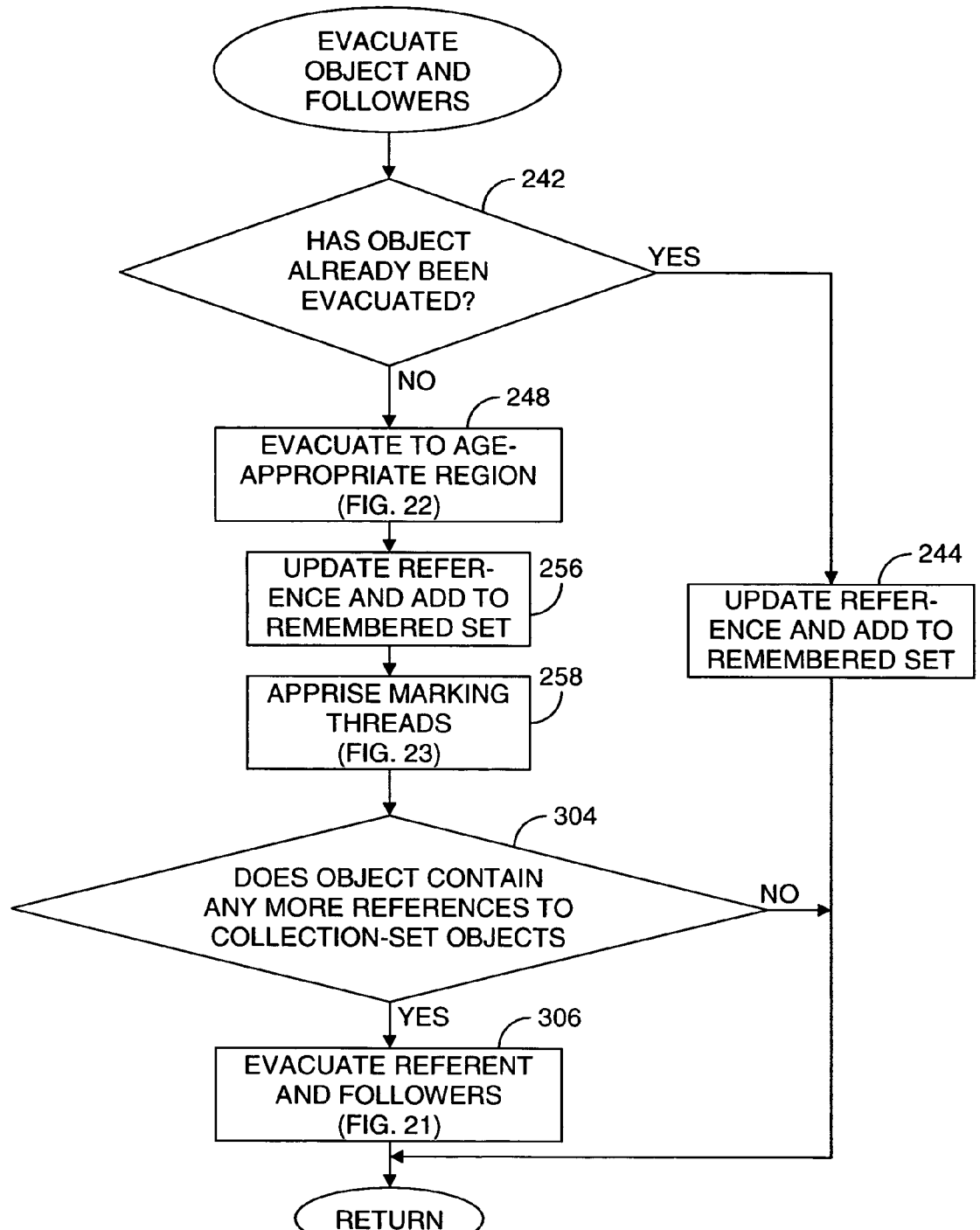
FIG. 21 is a flow chart of an object-evacuation routine that the illustrated embodiment employs.

FIG. 21 shows how the illustrated embodiment performs the object-evacuation operation that FIG. 5's block 66 represents. Block 242 represents determining whether the referred-to object has already been evacuated. When an object is evacuated in the illustrated embodiment, a field in the location from which it was evacuated is given a value indicating that the object was evacuated and identifying the location to which the evacuation occurred. If that field indicates that the object has already been evacuated, it is not evacuated again, but the reference that triggered execution of the FIG. 21 operation is updated, as block 244 indicates, to reflect the referred-to object's new location. That block also represents adding the reference's location to the remembered set of the region that contains the object unless the reference is itself in that region or that region is a popular-object region.

If the object has not been evacuated, on the other hand, it will need to be. Block 248 represents doing so, in an operation that FIG. 22 depicts in detail. Now, it has been observed in a wide range of programs that the "old" objects, i.e., objects that have survived several collections, tend to survive more collections. Even though the illustrated embodiment chooses collection sets predominantly in accordance with expected collection efficiency rather than age, we have recognized that there still is some value in segregating old objects into their own regions; doing so tends to make the other regions' collections more efficient. To support such age segregation, the illustrated embodiment includes in each region's metadata an age field, which is the subject of a test that FIG. 22's block 250 represents.

A region's age field is determined by the objects it has been selected to receive. In the illustrated embodiment, some regions, to which we will refer as "mutator-allocation regions," are selected to receive only objects that the mutator has newly allocated, while other regions, to which we will refer as "GC-allocation regions," receive only objects that the collector has evacuated. Unless memory is at a premium, no region contains both types of objects at the same time.

The mutator-allocation regions are assigned an age value of zero, to indicate that they contain only objects that have not yet survived any collections. When the collector evacuates an object from such a region, that object's "age" has increased to one: it has survived one collection. To implement age segregation, the collector evacuates such an object to a GC-allocation region whose age field indicates that it contains only one-collection-old objects. The receiving-region metadata's age field may already contain that age value, or, if the object is the first that the receiving region has received since it was last reclaimed, be given that by the collector in the process of copying the evacuated object.

When the collector is instead collecting a GC-allocation region, it similarly copies the evacuated objects into regions whose age values are one greater than the ages of the (GC-allocation) regions from which they were copied. This may be subject to an age limit, as FIG. 22 indicates by imposing an age limit of two. Specifically, block 250 determines whether the source region's age value is already two. If it is, the destination region's age value will also be two, as block 251 indicates. As block 252 indicates, the destination region's age value is otherwise one greater than the source region's. Block 253 represents copying the object to a region whose age is the one thus determined. Again, if heap space is at a premium, the collector may adopt a different mode, in which it permits age mixing within regions.

The collector then updates the reference to identify the object's new location, as FIG. 21's block 256 indicates, and makes any necessary remembered-set update as a result. It also performs an operation, represented by block 258, in which the evacuating thread apprises any marking threads of what it has done. To appreciate the reason for this operation, consider the following situation. An object is being evacuated from a location that it occupied at the beginning of a marking that was interrupted by the collection pause in which the evacuation occurs. The object is being evacuated because it was live at the beginning of the previous marking and an inter-region reference still refers to it. But suppose it actually has become unreachable—i.e., the object containing the reference to it is itself unreachable—and in fact was already unreachable at the beginning of the current (interrupted) marking. In its original region, it would therefore have been recognized as unreachable if that region's collection did not occur until the current marking was completed. In its new region, though, the object's location is above the one that the new region's next-top-at-mark-start value identified when the current marking began; it is implicitly marked. In the absence of a feature about to be described, it would therefore be considered live in the new region after the current marking is completed, even though it became unreachable before that marking started.

To avoid this result, the collector performs an operation, represented by FIG. 5's block 260, of so adjusting the next-top-at-mark-start value for each region into which it has evacuated objects that they are not marked implicitly. But this means that evacuated objects that are live with respect to the current marking have to be explicitly marked. This is the purpose served by the operation that FIG. 21's block 258 represents.

Figure 23:
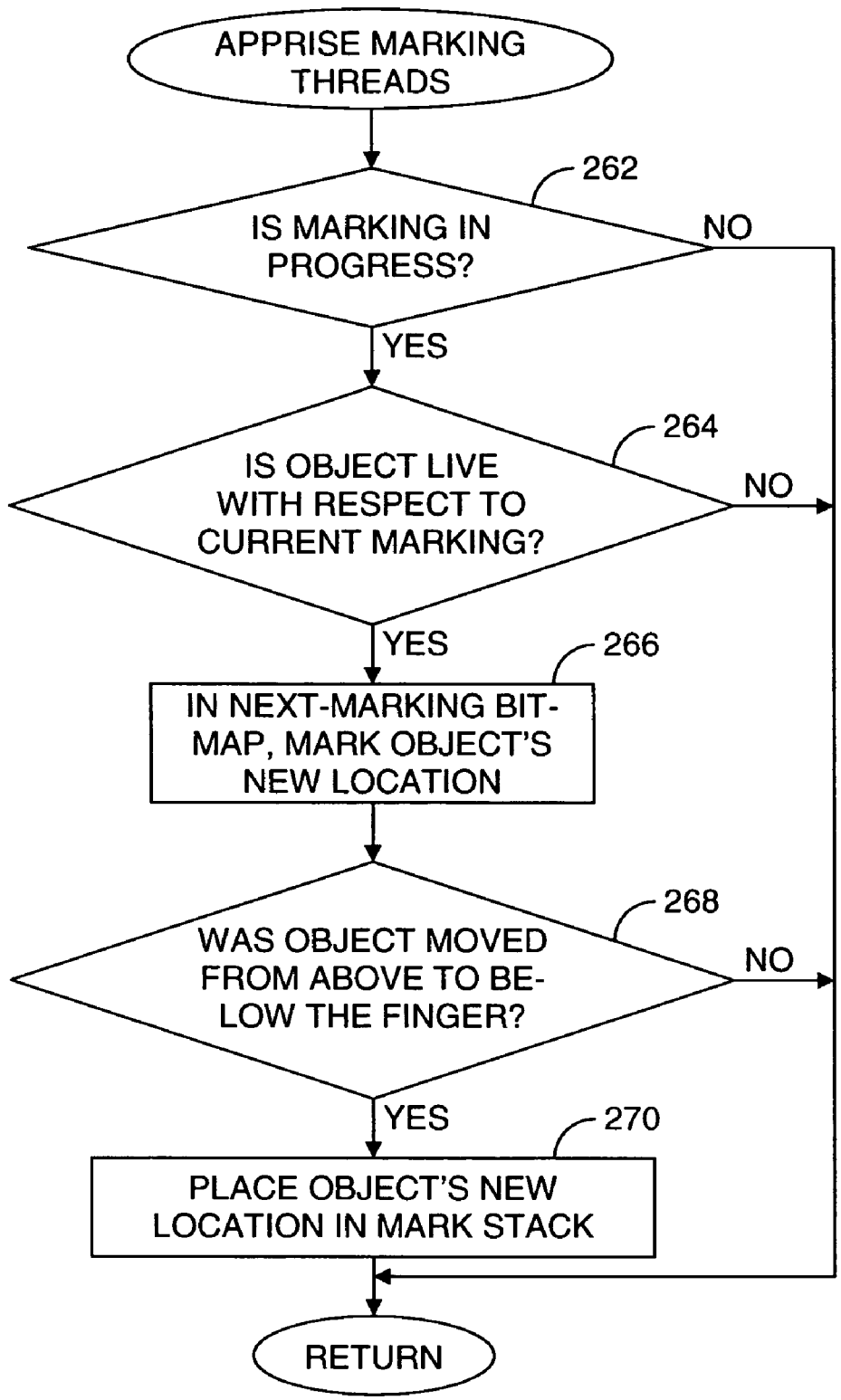
FIG. 23 is a flow chart of a routine employed by the FIG. 21 operation to apprise marking threads of certain object evacuations.

FIG. 23 illustrates that operation. As that drawing's block 262 indicates, no action needs to be taken if no marking is currently in progress. Otherwise, the collector determines whether the evacuated object is live with respect to the marking currently in progress, i.e., whether it is marked in the next-marking bitmap (explicitly marked) or located above its source region's next-top-at-mark-start location (implicitly marked). If its previous location is thereby determined to have been explicitly or implicitly marked with respect to the interrupted marking, the collector marks its new location with respect to that marking: as blocks 264 and 266 indicate, it sets the next-marking bitmap's bit that corresponds to the object's new location. As blocks 268 and 270 indicate, the collector additionally places the object's new location in the mark stack in that case if the object was moved from above the finger to below it; otherwise, the evacuation could prevent the object's sub-tree from being traced.

Many embodiments will need to perform an additional operation, represented by FIG. 5's block 272, to ensure the concurrent marking's correctness. As was stated above, the marking process determines the reachability that prevailed when the marking started. In contrast, any evacuation that occurs during an ongoing marking process is based on potential reachability determined later, at the time of the evacuation. In some embodiments it is therefore possible that objects reachable when the marking started are found at the time of the evacuation operation to be garbage. That is, their memory space will be reclaimed without their having been evacuated. This could yield an incorrect marking result if the collection occurs before marking has been completed, because such an object may contain a reference to an object that is still live but that can be identified as such in the marking process only through the reference in the now-dead object.

As a simple example, consider a situation in which a root points to object A at the start of the marking and in which object A in turn points to object B. In this scenario, object A will be marked during the initial marking. Let us further assume that, after object A has been marked but before the marking operation has traced the reference from object A to object B, the mutator changes the root pointer to point to object B rather than object A and that object A is thereby left unreachable. If object A's region becomes part of the collection set, object A's memory space will be reclaimed without object A's having been evacuated. Before that happens, the collector has to ensure that it has marked object B, because the root pointer may be the only pointer to object B, and that pointer was already scanned—when it pointed to object A instead.

One way of doing this is for the collector, at the end of each evacuation operation, to mark objects that are located outside the collection set and referred to by references in collection-set objects that were reachable at the start of the marking but remain unevacuated and are therefore about to have their memory space reclaimed. To this end, the collector examines the next-marking-bitmap portions that correspond to the portions of collection-set regions below their respective top-at-mark-start values, that is, that had been allocated by the start of the marking and therefore have relevant mark bits. For each collection-set object thereby indicated as having been marked, the collector determines whether that object has been evacuated. If it has, its mark bit has also been copied, so no further action is needed to preserve its reference information. If it has not, though, its memory space is about to be reclaimed without its having been evacuated. To preserve the reference information to the extent needed for marking, the collector therefore recursively marks all of its referents, except that in doing so it follows no reference chain beyond the first of that reference chain's objects that is located outside the collection set.

Figure 24:
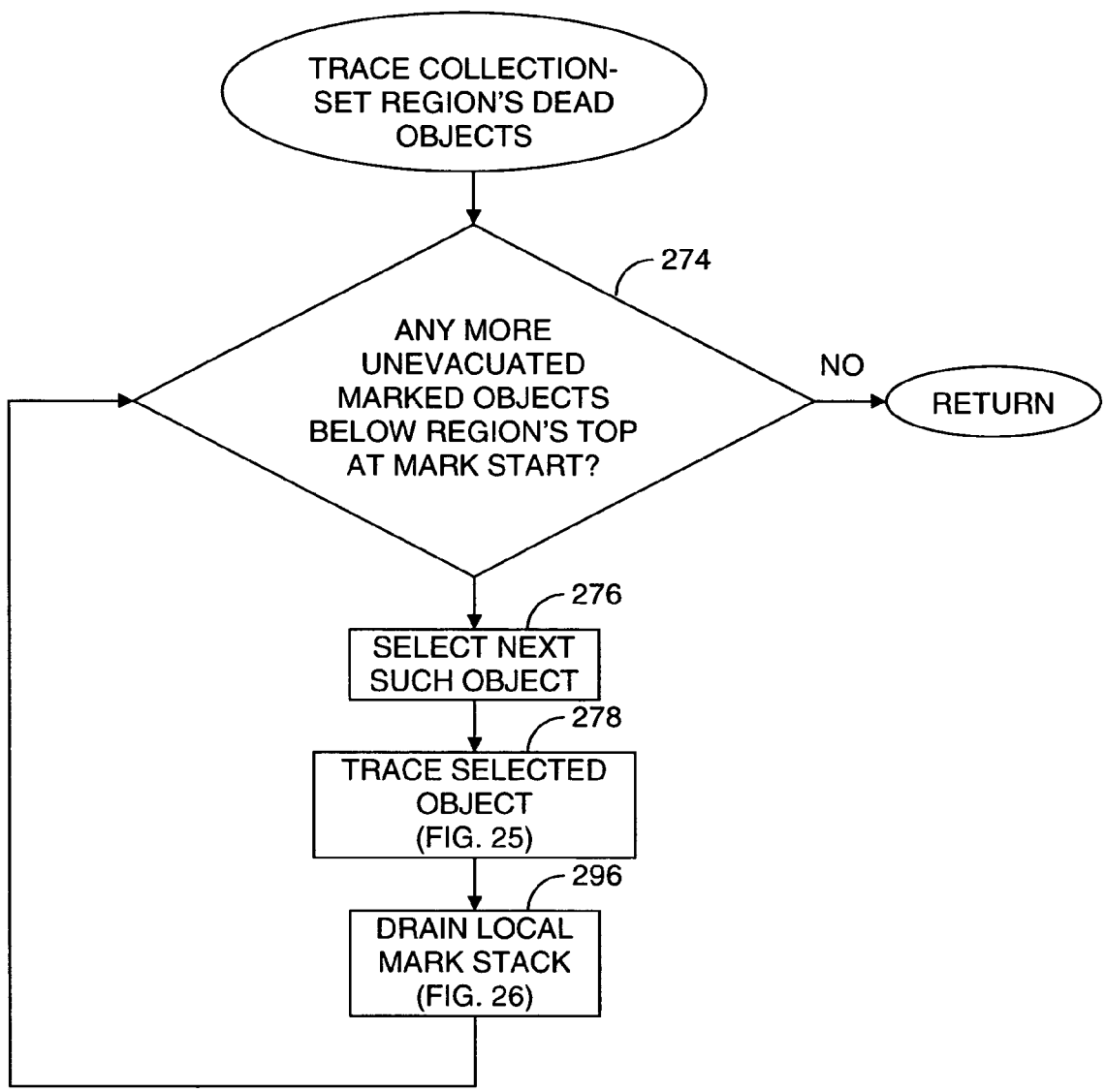
FIG. 24 is a flow chart of a routine employed to trace dead objects in a collection-set region.

An operation such as the one represented by FIG. 5's block 272 could be used for this purpose. The collector would perform this operation, which FIG. 24 shows in more detail, for each collection-set region whose top at mark start is above the bottom of the region. As blocks 274 and 276 indicate, the collector selects each object in the region that is marked but not evacuated and is located below the region's top at mark start.

Now, among the operations performed at the beginning of a FIG. 5 collection (but not shown explicitly in that drawing) is one in which the collector copies into the marking thread's mark stack the references from all of the marking buffers, both complete and incomplete. In the process, the collector marks the referents of the references thus copied. So, if a now-dead collection-set object was reachable at the start of the marking through a reference that has now been overwritten, that collection-set object will have been marked, and the FIG. 24 operation will therefore trace its references.

Figure 25:
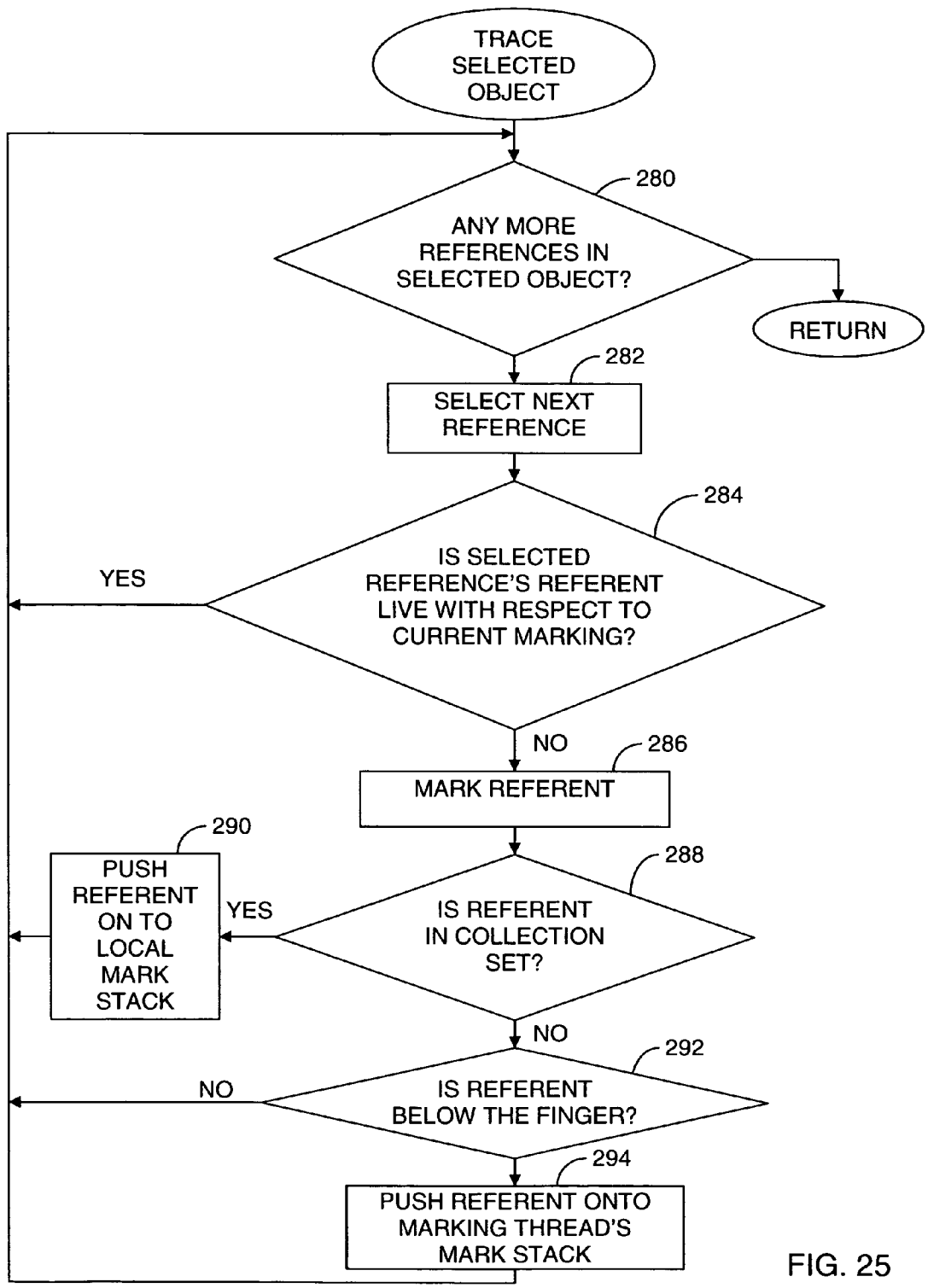
FIG. 25 is a flow chart of and operation that the FIG. 24 routine uses to trace an object's references.

As block 278 indicates, the collector traces that object's references, in a routine that FIG. 25 depicts. As FIG. 25's blocks 280 and 282 indicate, the collector selects each of the object's references in turn until it has considered each reference. As block 284 indicates, the collector simply proceeds to the next reference if the selected reference's referent already appears live with respect to the current marking, either because it has already been marked or because it is implicitly live as a result of its location above its region's top at mark start. If it is live only implicitly, i.e., if it was not among the objects in existence at the beginning of the current marking, there is no need to trace its references to preserve that marking's correctness. And if it has already been marked, then its references have already been traced or, as will be seen, have already been scheduled for tracing.

If the block-284 determination is instead that the object does not already appear live with respect to the current marking, the collector marks the referent, as block 286 indicates, and then, as block 288 indicates, determines whether the referent belongs to the collection set. If so, any references that it has must be traced further to determine whether the resultant reference chain reaches outside the collection set. For this purpose, the collector pushes the referent onto a local marking stack, as block 290 indicates.

If the referent is not in the collection set, though, then the collector has achieved the desired result of marking the first of the reference chain's objects that is located outside the collection set. To ensure that the current marking thread will trace the referent's references, the collector performs the block-292 operation of determining whether the referent is located below the current-marking thread's finger. If it is not, the concurrent-marking thread has not reached it in its traversal of the current-marking bitmap, so it will trace the referent's references when it reaches that referent. Otherwise, as block 294 indicates, the collector needs to push the referent onto the marking thread's mark stack to ensure that further tracing occurs.

Figure 26:
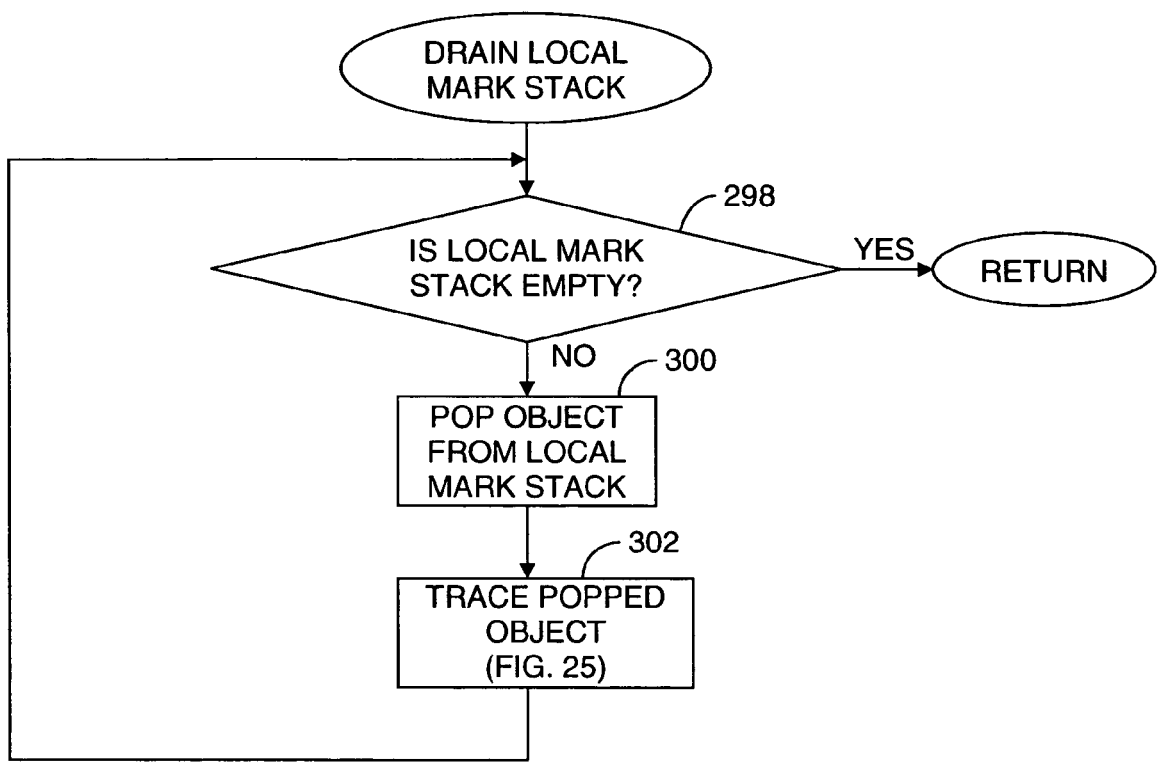
FIG. 26 is a flow chart of a routine used by the FIG. 24 routine to drain a local mark stack that it maintains.

As FIG. 25 indicates, the collector performs this tracing operation for each of the selected object's references. When it has done so, it may have left referents in its local mark stack as a result of its block-290 operation. As FIG. 24's block 296 indicates, it therefore drains that local mark stack, in an operation that FIG. 26 depicts. As FIG. 26's block 298 indicates, the collector first determines whether the local mark stack lists any objects at all. If not, the draining operation ends. Otherwise, as block 300 indicates, the collector pops the top object from the local mark stack and traces it, as block 302 indicates. The tracing operation is the one that FIG. 25 depicts.

Now, the FIG. 24 operation adds to the evacuation operation's expense, so some embodiments may be arranged to avoid it to the extent possible. To do so, some embodiments may restrict concurrent marking operations to regions for which the FIG. 24 operation is unnecessary. A collector may, for example, adopt a two-generation approach, in which all newly allocated objects are placed initially in a young generation and are then promoted to a different, mature generation as soon as they have survived a collection. Such an embodiment may perform the marking operation's initial phase, i.e., the phase in which it marks only referents of the basic root set, as part of an evacuation. Conceptually, the initial marking in such an embodiment is performed immediately after evacuation is completed, before any subsequent reference mutation has had a chance to occur. While concurrent marking is in progress, moreover, such an embodiment may restrict collection to young-generation regions. A result of this scheme is that no object located in a collection set collected in the midst of a marking operation will have been allocated before that operation started. Consequently, there is no need to trace reference chains through those objects, so no marking has to be performed during their collection.

A generational collector may also employ a hybrid of these two approaches. That is, it may so arrange young-generation marking that the young generation contains no objects allocated before the marking currently in progress, yet it may do so without restricting concurrent collections to young-generation regions. For the mature-generation regions, marking will still need to be done in connection with reclamation, but, since most reclamation occurs in young-generation regions, the additional marking effort will tend to be modest.

These steps preserve partial-marking information across the collection pause and avoid the result mentioned above. If the evacuated object was unreachable at the start of the current marking, it will be unmarked in its new location, too, and, because the next-stop-at-mark-start value has been raised above that object's address, that object will be recognized as garbage if its new region is collected when the current marking has been completed. In addition, mark bits will be propagated from any "gray" (marked but not yet traced) garbage objects inside the collection set to objects outside the collection set, to ensure the marking's correctness.

Now, this way of apprising the marking thread of the evacuation may appear to depend on using the approach, mentioned above, of employing a given region only for evacuation or only for new-object allocation but not for both. In GC-allocation regions, that is, the next-top-at-mark-start value is increased when an object is added, whereas it stays the same when an object is added in a mutator-allocation region. With a minor refinement to the block-266 operation, though, the within-region mixing that may be permitted in some implementations when memory is low can readily be accommodated.

Specifically, the collector can first compare the region's next-top-at-mark-start value with its "top" value, i.e., with the value in the region's metadata field that indicates where the next object should be placed. From the foregoing description, it can be appreciated that these values will ordinarily be the same for GC-collection regions but will often be different for mutator-allocation regions. If they differ for a region into which the collector is evacuating objects, then mixing is occurring. But the collector can still pre-serve the partial-marking information by taking into account the fact that the newly allocated objects must be live with respect to the marking currently in progress: before it increments the next-top-at-mark-start value by the evacuated object's size, it can mark the bitmap bits for all locations whose addresses lie between the top value and the (not-yet-incremented) next-top-at-mark-start value.

This completes the discussion of the operation, represented by FIG. 21's block 258, in which the collector apprises the marking thread of the object's evacuation. After it has done so, it recursively evacuates the object's followers, as blocks 304 and 306 indicate.

We now return to the manner in which the illustrated embodiment deals with interactions between the evacuating and marking operations. If the collection interrupted a marking operation, that operation's mark stack may contain references to collection-set locations, so the collection-set reclamation can make those entries stale. As FIG. 5's block 310 indicates, one way to address this is to update those entries. That is, the collector could identify all mark-stack entries that refer to collection-set locations, update those that refer to locations from which objects have been evacuated, and set the others to NULL.

An alternative, and one that we prefer, is not to perform a separate operation of the type that block 310 represents. Instead, we treat the mark stack as a source of roots in the root-processing operation of block 60. We precede that operation by one, not shown in FIG. 5, in which we process all of the marking buffers, including the incomplete thread-local ones, to make sure that all overwritten references have been marked and, if necessary, their scanning scheduled. Since in this approach the collection-set referents of all mark-stack entries are necessarily evacuated as part of root-set processing, a separate updating operation of the type that block 310 represents is unnecessary.

In any event, the illustrated embodiment further provides for interaction between the marking and collecting by including in the block-68 operation a step in which the marking-bitmap bits corresponding to all reclaimed collection-set locations are reset in both bitmaps.

We now turn briefly to the manner in which the illustrated embodiment ordinarily selects collection sets. As was explained above, that selection is ordinarily based on each candidate region's expected collection efficiency, and that in turn is based on an estimate of the number of live bytes in the region. As was also explained above, the expected number of live bytes is inferred from a maximum-live-byte value that results from the marking operation. This value is most reliable for regions that were completely allocated at the beginning of the previous marking. It is less reliable for others, since any object not allocated when that marking started is marked implicitly, so the marking operation is not effective at identifying such objects as unreachable. For such regions, the collector may instead base its live-byte estimate on, say, the number of allocated bytes and some measure of the region's age. While the particular way in which the live-byte estimate is made for such regions is not germane to the invention, one way involves starting with a configured relationship between live-byte rate and age and then refining it by experience. For example, a live-byte rate for age-zero regions can be estimated as part of the collection process. As objects are evacuated, a count of the number of evacuated bytes can be kept for each such region. The average number of live bytes in the collection set's age-zero regions can then be calculated, and the estimate used in efficiency calculations can be updated with the result by, for instance, computing an exponential average over time.

Then, as the efficiencies are ranked for the pre-existing regions, i.e., for the regions whose estimates from the marking operation are considered more reliable, their efficiency estimates are compared with the estimates for the regions that were not pre-existing. When that ranking reaches pre-existing regions for which the estimates are lower than for the non-pre-existing ones, the non-pre-existing regions begin to be selected.

Although the marking operation's results are beneficial, a marking operation is expensive, so it will be best in most applications not to have marking operations in progress all the time. Decisions therefore have to be made regarding when to perform the marking. One way is simply to pick some number of collection pauses and begin a new marking operation each time that many pauses have taken place. Another is to trigger a marking operation when the application reaches a point in its execution known not to be very demanding in its use of resources. Other approaches have also been suggested. In addition to or instead of such approaches, we propose to base the marking-initiation decision on an efficiency criterion.

The illustrated embodiment implements this approach in a way that we believe tends to result in optimum use of the marking information. Let us call a given marking and all collection activity that occurs between when it starts and when the next marking starts a marking cycle. The illustrated embodiment implements the efficiency-based approach by evaluating a cumulative efficiency over a marking cycle. Although different embodiments may use different efficiency metrics, efficiency can in general be defined as the ratio of how much memory is reclaimed to what it costs to reclaim it. In most cases, it will be computed as ratio of a number of bytes reclaimed to some measure of the time used to reclaim them.

The illustrated embodiment's time-cost computation begins when a marking operation does. In a processor-operation context, of course, there is more than one way to measure time, but most ways are adequate for this purpose. In the particular case of the illustrated embodiment, each interval of duration t during which the marking operation holds other operations' threads suspended is considered to impose a cost of nt on an n-processor system. For other, concurrent-operation intervals, the illustrated embodiment considers marking cost to be the amount of processor time the marking threads consume. Other embodiments may omit certain processor-time elements from the cost because accounting for them is not worth the additional accuracy or because they use otherwise-idle processor time and can therefore be considered "free." In any event, the sum gives a value T that can be considered the cost of the marking operation itself.

As was mentioned above, the marking interval includes reclaiming regions in which it has marked no objects. When the garbage collector uses the type of marking-operation triggering here described, that reclamation operation includes counting the number of garbage bytes thereby reclaimed. For each such region, the difference between the region's starting address and the address indicated by the top value, where the next object would have been placed, can be used as the number of garbage bytes reclaimed from that region. The collector totals those values to arrive at the marking operation's garbage-reclamation total G.

Some embodiments may use that value divided by the total marking-operation time T as the cumulative-efficiency value for the end of the marking operation. As will be seen, a more-exact measure may be to include in G in the amount of memory reclaimed during collection pauses that occur between the times when the marking operation begins and when it ends and to include in T the time required for those pauses and any other collection activity, such as the concurrent-remembered-set-updating operations. Some embodiments may therefore take those factors into account, too, in determining the cumulative efficiency.

The collector then re-computes the efficiency value each time a collection increment occurs. As was mentioned above, different embodiments may base their decisions to initiate collection increments on different criteria. For the sake of concreteness, though, let us assume that the routine called by the monitor to allocate heap space includes determining whether the amount allocated so far but not reclaimed has reached a threshold and triggering a collection increment if it has. The threshold may, for example, be a fixed configured value or some fraction of the total heap size. Additionally, some embodiments may use a higher threshold when a marking is in progress and a lower one between markings, the theory being that the collection will be more efficient immediately after the marking, when the best candidate for collection can be identified most accurately, than during marking, when the previous marking's results are the most stale.

Figure 27:
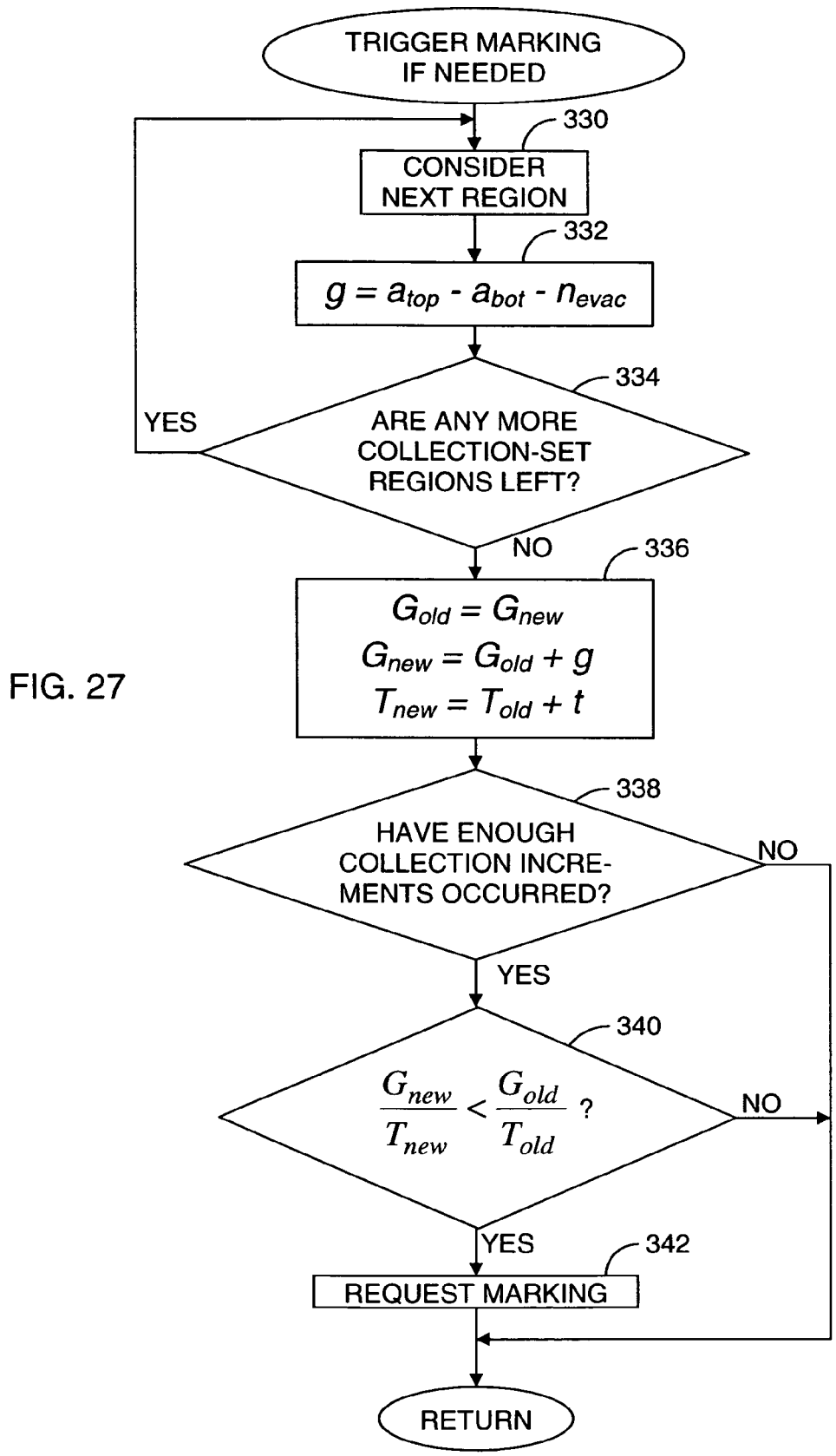
FIG. 27 is a flow chart depicting the way in which the illustrated embodiment determines when to initiate a new marking cycle.

In any event, the collector keeps track of how many bytes it has evacuated from each collection-set region. When it has evacuated all potentially live objects, it can then calculate the cumulative efficiency and determine whether to trigger a new marking cycle. FIG. 27 depicts one way of making that determination. In the FIG. 27 operation, which can be thought of as part of the operation of FIG. 5's block-66 reclamation operation but may in fact be dispersed throughout the collection operation, the collector considers each collection-set region in turn, as block 330 indicates. For each one, it calculates the number of garbage bytes it is reclaiming from that region and adds that number to the total garbage g for the collection increment as a whole, as block 332 indicates.

This continues, as block 334 indicates, until it has considered all the collection-set regions and has thereby completed computing the collection increment's total garbage-byte count g. With this value determined, it computes a new value $G_{new}$ for the marking cycle's collection and also updates the marking cycle's total collection cost $T_{new}$, as block 336 indicates.

The cumulative efficiency will in most applications be relatively low initially, because the marking operation will usually be expensive whereas the amount of garbage in garbage-only regions usually will usually be low. For a while thereafter it will usually improve as the collector incorporates further collection increments' results in it. So the basis on which the illustrated embodiment makes its decision is that, when a marking operation has been completed, the marking cycle that it starts should continue—i.e., no new marking operation should commence—so long as that cycle's cumulative efficiency is increasing. When the efficiency does turn down—or, in some embodiments, merely fails to improve—the collector starts a new marking cycle.

The theory behind this approach can be understood by postulating a program running on a steady-state basis. Under that assumption, all marking cycles have essentially the same efficiency if the strategy for triggering marking operations is based on cumulative efficiency and the same criterion is used each time. Since all cycles have the same efficiency, that efficiency is the collection efficiency of the overall program. So, if the collector initiates a collection when the marking cycle's cumulative efficiency is at a peak, it optimizes the collection efficiency for the program as a whole.

FIG. 27's blocks 338, 340, and 342 represent implementing this criterion, with a minor variation. Although one can imagine situations in which the cumulative efficiency initially starts high and almost immediately deteriorates, the illustrated embodiment is based on the theory that a dip in cumulative efficiency in any of the first few collection intervals is much more likely to be indicative merely of an isolated pathological collection increment, not of a longer-term trend in the marking cycle's efficiency. As block 338 indicates, the illustrated embodiment therefore triggers the start of a new marking cycle only if the current increment is not one of the first few in the cycle.

The present invention's teachings enable a garbage collector to maximize collection efficiency. It therefore constitutes a significant advance in the art.

What is claimed is:

1. A computer system configured by stored instructions as a garbage collector that reclaims for reuse memory allocated from a heap by a mutator executing on the computer system, wherein the garbage collector:
   A) performs a global marking operation on the heap;
   B) treats the heap as divided into a plurality of heap regions, wherein the garbage collector maintains a remembered set associated with a heap region of the plurality of heap regions, independently of which other heap regions contain references to objects in the heap region, wherein entries in the remembered set identify the locations of the references;
   C) performs space-incremental-collection operations, associated with a collection set comprising the heap region, in which the garbage collector employs the remembered set associated with the heap region in the collection set to determine whether objects in the heap region satisfy a potential-reachability criterion and reclaims memory occupied by objects that do not satisfy the potential-reachability criterion; and
   D) selects the heap region for the collection set by performing a collection-efficiency estimate calculation based on a result of the global marking operation,
   wherein the collection-efficiency estimate calculation includes determining which of a set of candidate groups of regions yields a greater ratio of likely memory reclamation to reclamation cost,
   wherein each space-incremental-collection operation includes processing d remembered-set-log-buffer entries, d≧0, in order to update remembered sets,
   wherein the reclamation cost V(cs) for a candidate group cs of regions is determined in accordance with $$V(cs) = V_{fixed} + U \cdot d + \sum_{r \in cs} (S \cdot rsSize(r) + C \cdot liveBytes(r)), \text{ and}$$

wherein $V_{fixed}$ represents fixed costs common to all pauses, d is the number of remembered-set-log-buffer entries to be scanned during that space-incremental-collection operation, U is the average cost of scanning a remembered-set-log-buffer entry, S is the cost per remembered-set entry of scanning a remembered set, rsSize(r) is the number of remembered-set entries in the remembered set maintained for region r, C is the cost per byte of evacuating and scanning an object that is not reclaimed, and live-Bytes(r) is an estimate of how man bytes will not be reclaimed from region r.

2. The computer system as defined in claim 1, wherein the collection-efficiency estimate calculation includes, for regions containing only objects allocated at a beginning of the global marking operation, estimating from the result of the global marking operation respective amounts of memory likely to be reclaimed if those regions are included in the collection set.

3. The computer system as defined in claim 2, wherein the global marking operation is performed at least in part concurrently with the mutator's execution.

4. The computer system as defined in claim 2, wherein:
A) the global marking operation includes tracing a reference chain from a root set and marking objects in the heap region that are reachable;
B) at least one space-incremental-collection operation of the space-incremental-collection operations includes:
  i) inferring from the global marking operation that an object in the heap region is unreachable; and
  ii) reclaiming the memory space occupied by the object.

5. The computer system as defined in claim 2, wherein the collection-efficiency estimate calculation includes calculating a cost from a size of the remembered set.

6. The computer system as defined in claim 1, wherein:
A) the global marking operation includes tracing a reference chain from a root set and marking objects in the heap region that are reachable;
B) at least one space-incremental-collection operation of the space-incremental-collection operations includes:
  i) inferring from the global marking operation that an object in the heap region is unreachable; and
  ii) reclaiming the memory space occupied by the object objects.

7. The computer system as defined in claim 1, wherein the global marking operation is performed at least in part concurrently with the mutator's execution.

8. A method of employing a computer system to reclaim for reuse memory dynamically allocated from a heap in the computer system's memory by a mutator executing on that computer system, a method comprising:
A) performs a global marking operation on the heap;
B) treats the heap as divided into a plurality of heap regions, wherein the garbage collector maintains a remembered set associated with a heap region of the plurality of heap regions, independently of which other heap regions contain references to objects in the heap region, wherein entries in the remembered set identify the locations of the references;
C) performs space-incremental-collection operations, associated with a collection set comprising the heap region, in which the garbage collector employs the remembered set associated with the heap region in the collection set to determine whether objects in the heap region satisfy a potential-reachability criterion and reclaims memory occupied by objects that do not satisfy the potential-reachability criterion; and
D) selects the heap region for the collection set by performing a collection-efficiency estimate calculation based on a result of the global marking operation,
wherein the collection-efficiency estimate calculation includes determining which of a set of candidate groups of regions yields a greater ratio of likely memory reclamation to reclamation cost,
wherein each space-incremental-collection operation includes processing d remembered-set-log-buffer entries, $d \geq 0$, in order to update remembered sets,
wherein the reclamation cost V(cs) for a candidate group cs of regions is determined in accordance with $$V(cs) = V_{fixed} + U \cdot d + \sum_{r \in cs} (S \cdot rsSize(r) + C \cdot liveBytes(r)), \text{ and}$$

wherein $V_{fixed}$ represents fixed costs common to all pauses, d is the number of remembered-set-log-buffer entries to be scanned during that space-incremental-collection operation, U is the average cost of scanning a remembered-set-log-buffer entry, S is the cost per remembered-set entry of scanning a remembered set, rsSize(r) is the number of remembered-set entries in the remembered set maintained for region r, C is the cost per byte of evacuating and scanning an object that is not reclaimed, and live-Bytes(r) is an estimate of how many bytes will not be reclaimed from region r.

9. The computer system as defined in claim 8, wherein the collection-efficiency estimate calculation includes, for regions containing only objects allocated at a beginning of the global marking operation, estimating from the result of the global marking operation respective amounts of memory likely to be reclaimed if those regions are included in the collection set.

10. The method as defined in claim 9, wherein the global marking operation is performed at least in part concurrently with the mutator's execution.

11. The method as defined in claim 9, wherein:
A) the global marking operation includes tracing a reference chain from a root set and marking objects in the heap region that are reachable;
B) at least one space-incremental-collection operation of the space-incremental-collection operations includes:
  i) inferring from the global marking operation that an object in the heap region is unreachable; and
  ii) reclaiming the memory space occupied by the object.

12. The method as defined in claim 9, wherein the collection-efficiency estimate calculation includes calculating a cost from a size of the remembered set.

13. The method as defined in claim 8 wherein:
A) the global marking operation includes tracing a reference chain from a root set and marking objects in the heap region that are reachable;
B) at least one space-incremental-collection operation of the space-incremental-collection operations includes:
  i) inferring from the global marking operation that an object in the heap region is unreachable; and
  ii) reclaiming the memory space occupied by the object.

14. The method as defined in claim 8, wherein the global marking operation is performed at least in part concurrently with the mutator's execution.

15. A storage medium containing instructions readable by a computer system to configure the computer system as a garbage collector that reclaims for reuse memory allocated from a heap by a mutator executing on the computer system, wherein the garbage collector:
A) performs a global marking operation on the heap;
B) treats the heap as divided into a plurality of heap regions, wherein the garbage collector maintains a remembered set associated with a heap region of the plurality of heap regions, independently of which other heap regions contain references to objects in the heap region, wherein entries in the remembered set identify the locations of the references;

C) performs space-incremental-collection operations, associated with a collection set comprising the heap region, in which the garbage collector employs the remembered set associated with the heap region in the collection set to determine whether objects in the heap region satisfy a potential-reachability criterion and reclaims memory occupied by objects that do not satisfy the potential-reachability criterion; and D) selects the heap region for the collection set by performing a collection-efficiency estimate calculation based on a result of the global marking operation, wherein the collection-efficiency estimate calculation includes determining which of a set of candidate groups of regions yields a greater ratio of likely memory reclamation to reclamation cost, wherein each space-incremental-collection operation includes processing d remembered-set-log-buffer entries, $d \geq 0$, in order to update remembered sets, wherein the reclamation cost V(cs) for a candidate group cs of regions is determined in accordance with $$V(cs) = V_{fixed} + U \cdot d + \sum_{r \in cs}(S \cdot rsSize(r) + C \cdot liveBytes(r)), \text{ and}$$

wherein $V_{fixed}$ represents fixed costs common to all pauses, d is the number of remembered-set-log-buffer entries to be scanned during that space-incremental-collection operation, U is the average cost of scanning a remembered-set-log-buffer entry, S is the cost per remembered-set entry of scanning a remembered set, rsSize(r) is the number of remembered-set entries in the remembered set maintained for region r, C is the cost per byte of evacuating and scanning an object that is not reclaimed and live-Bytes(r) is an estimate of how many bytes will not be reclaimed from region r.

16. A storage medium as defined in claim 15 wherein the collection-efficiency estimate calculation includes, for regions containing only objects allocated at a beginning of the global marking operation, estimating from the result of the global marking operation respective amounts of memory likely to be reclaimed if those regions are included in the collection set.

17. The storage medium as defined in claim 16, wherein the global marking operation is performed at least in part concurrently with the mutator's execution.

18. The storage medium as defined in claim 16 wherein:
A) the global marking operation includes tracing a reference chain from a root set and marking objects in the heap region that are reachable;
B) at least one space-incremental-collection operation of the space-incremental-collection operations includes:
 i) inferring from the global marking operation that an object in the heap region is unreachable; and
 ii) reclaiming the memory space occupied by the object.

19. The storage medium as defined in claim 16, wherein the collection-efficiency estimate calculation includes calculating a cost from a size of the remembered set.

20. The storage medium as defined in claim 15 wherein:
A) the global marking operation includes tracing a reference chain from a root set and marking objects in the heap region that are reachable;
B) at least one space-incremental-collection operation of the space-incremental-collection operations includes:
 i) inferring from the global marking operation that an object in the heap region is unreachable; and
 ii) reclaiming the memory space occupied by the object.

21. The storage medium as defined in claim 15 wherein the global marking operation is performed at least in part concurrently with the mutator's execution.

22. For employing a computer system to reclaim for reuse memory dynamically allocated from a heap in the computer system's memory by a mutator executing on that computer system, a garbage collector comprising:
A) means for performing a global marking operation on the heap;
B) means for treating the heap as divided into a plurality of heap regions, wherein the garbage collector maintains a remembered set associated with a heap region of the plurality of heap regions, independently of which other heap regions contain references to objects in the heap region, wherein entries in the remembered set identify the locations of the references;
C) means for performing space-incremental-collection operations, associated with a collection set comprising the heap region, in which the garbage collector employs the remembered set associated with the heap region in the collection set to determine whether objects in the heap region satisfy a potential-reachability criterion and reclaims memory occupied by objects that do not satisfy the potential-reachability criterion; and
D) means for selecting the heap region for the collection set by performing a collection-efficiency estimate calculation based on a result of the global marking operation, wherein the collection-efficiency estimate calculation includes determining which of a set of candidate groups of regions yields a greater ratio of likely memory reclamation to reclamation cost, wherein each space-incremental-collection operation includes processing d remembered-set-log-buffer entries, $d \geq 0$, in order to update remembered sets, wherein the reclamation cost V(cs) for a candidate group cs of regions is determined in accordance with $$V(cs) = V_{fixed} + U \cdot d + \sum_{r \in cs}(S \cdot rsSize(r) + C \cdot liveBytes(r)), \text{ and}$$

wherein $V_{fixed}$ represents fixed costs common to all pauses, d is the number of remembered-set-log-buffer entries to be scanned during that space-incremental-collection operation, U is the average cost of scanning a remembered-set-log-buffer entry S is the cost per remembered-set entry of scanning a remembered set, rsSize(r) is the number of remembered-set entries in the remembered set maintained for region r, C is the cost per byte of evacuating and scanning an object that is not reclaimed and live-Bytes(r) is an estimate of how many bytes will not be reclaimed from region r.

* * * * *

UNITED STATES PATENT AND TRADEMARK OFFICE
CERTIFICATE OF CORRECTION

| | | |
|---|---|---|
| PATENT NO. | : 7,340,494 B1 | Page 1 of 1 |
| APPLICATION NO. | : 10/985447 | |
| DATED | : March 4, 2008 | |
| INVENTOR(S) | : David L. Detlefs et al. | |

It is certified that error appears in the above-identified patent and that said Letters Patent is hereby corrected as shown below:

In Claim 1, Column 28 (line 64), replace "man" with --many--;

In Claim 15, Column 31 (line 36), insert --,-- after --reclaimed--;

In Claim 22, Column 32 (line 56), insert --,-- after --entry--; and

In Claim 22, Column 32 (line 61), insert --,-- after --reclaimed--.

Signed and Sealed this

Eighth Day of June, 2010

David J. Kappos
*Director of the United States Patent and Trademark Office*